(12) United States Patent
Komsthoeft et al.

(10) Patent No.: US 6,664,962 B1
(45) Date of Patent: Dec. 16, 2003

(54) SHADOW MAPPING IN A LOW COST GRAPHICS SYSTEM

(75) Inventors: Matthew Komsthoeft, Santa Clara, CA (US); K. Michael Ockenden, Vancouver (CA); Yoshitaka Yasumoto, Osaka (JP); Kazuki Hirose, Bellevue, WA (US)

(73) Assignee: Nintendo Co., Ltd., Kyoto (JP)

( * ) Notice: Subject to any disclaimer, the term of this patent is extended or adjusted under 35 U.S.C. 154(b) by 219 days.

(21) Appl. No.: 09/722,421

(22) Filed: Nov. 28, 2000

Related U.S. Application Data
(60) Provisional application No. 60/227,006, filed on Aug. 23, 2000.

(51) Int. Cl.[7] .............................................. G06T 15/60
(52) U.S. Cl. ........................ 345/426; 345/421; 345/422; 345/582; 345/589
(58) Field of Search ................................ 345/426, 421, 345/422, 419, 420, 582, 589, 427, 473

(56) References Cited

U.S. PATENT DOCUMENTS

| | | | |
|---|---|---|---|
| 4,388,620 A | 6/1983 | Sherman |
| 4,425,559 A | 1/1984 | Sherman |
| 4,570,233 A | 2/1986 | Yan et al. |
| 4,625,289 A | 11/1986 | Rockwood |
| 4,658,247 A | 4/1987 | Gharachorloo |
| 4,725,831 A | 2/1988 | Coleman |
| 4,829,295 A | 5/1989 | Hiroyuki |
| 4,862,392 A | 8/1989 | Steiner |
| 4,866,637 A | 9/1989 | Gonzalez-Lopez et al. |
| 4,901,064 A | 2/1990 | Deering |
| 4,914,729 A | 4/1990 | Omori et al. |
| 4,945,500 A | 7/1990 | Deering |
| 5,043,922 A | 8/1991 | Matsumoto |
| 5,136,664 A | 8/1992 | Bersack et al. |
| 5,170,468 A | 12/1992 | Shah et al. |
| 5,255,353 A | 10/1993 | Itoh |
| 5,377,313 A | 12/1994 | Scheibl |
| 5,392,385 A | 2/1995 | Evangelisti et al. |
| 5,392,393 A | 2/1995 | Deering |
| 5,402,532 A | 3/1995 | Epstein et al. |
| 5,421,028 A | 5/1995 | Swanson |

(List continued on next page.)

FOREIGN PATENT DOCUMENTS

| | | |
|---|---|---|
| CA | 2070934 | 12/1993 |
| EP | 1 074 945 | 2/2001 |

(List continued on next page.)

OTHER PUBLICATIONS

Michael McCool, "Shadow Volume Reconstruction from Depth Maps", ACM Transactions of Graphics, vol. 19, No. 1, Jan. 2000, pp. 1–26.*

(List continued on next page.)

*Primary Examiner*—Mark Zimmerman
*Assistant Examiner*—Kimbinh T. Nguyen
(74) *Attorney, Agent, or Firm*—Nixon & Vanderhye P.C.

(57) ABSTRACT

A graphics system including a custom graphics and audio processor produces exciting 2D and 3D graphics and surround sound. The system includes a graphics and audio processor including a 3D graphics pipeline and an audio digital signal processor. Full-scene shadow mapping can be performed by having the lighting hardware calculate distance using a distance attenuation function. If more precision is desirable, texture coordinate generating hardware can be used to calculate texture coordinates that index into a ramp texture lookup storing precision distance values. A unique ramp texture providing redundant values can be used to eliminate ramp texture lookup errors.

15 Claims, 20 Drawing Sheets

(1 of 20 Drawing Sheet(s) Filed in Color)

EXAMPLE MORE DETAILED SHADOW MAPPING PROCEDURE

U.S. PATENT DOCUMENTS

| | | |
|---|---|---|
| 5,457,775 A | 10/1995 | Johnson, Jr. et al. |
| 5,504,917 A | 4/1996 | Austin |
| 5,594,854 A | 1/1997 | Baldwin et al. |
| 5,608,424 A | 3/1997 | Takahashi et al. |
| 5,687,357 A | 11/1997 | Priem |
| 5,701,444 A | 12/1997 | Baldwin |
| 5,721,947 A | 2/1998 | Priem et al. |
| 5,727,192 A | 3/1998 | Baldwin |
| 5,739,819 A | 4/1998 | Bar-Nahum |
| 5,742,749 A * | 4/1998 | Foran et al. ............... 345/426 |
| 5,758,182 A | 5/1998 | Rosenthal et al. |
| 5,764,243 A | 6/1998 | Baldwin |
| 5,768,626 A | 6/1998 | Munson et al. |
| 5,768,629 A | 6/1998 | Wise et al. |
| 5,774,133 A | 6/1998 | Neave et al. |
| 5,777,629 A | 7/1998 | Baldwin |
| 5,798,770 A | 8/1998 | Baldwin |
| 5,801,706 A | 9/1998 | Fujita et al. |
| 5,801,716 A | 9/1998 | Silverbrook |
| 5,805,868 A | 9/1998 | Murphy |
| 5,815,166 A | 9/1998 | Baldwin |
| 5,821,949 A | 10/1998 | Deering |
| 5,870,097 A | 2/1999 | Snyder et al. |
| 5,870,098 A | 2/1999 | Gardiner |
| 5,874,969 A | 2/1999 | Storm et al. |
| 5,917,496 A | 6/1999 | Fujita et al. |
| 5,920,326 A | 7/1999 | Rentschler et al. |
| 5,940,086 A | 8/1999 | Rentschler et al. |
| 5,949,424 A | 9/1999 | Cabral et al. |
| 5,949,440 A | 9/1999 | Krech, Jr. et al. |
| 5,966,134 A | 10/1999 | Arias |
| 5,969,726 A | 10/1999 | Rentschler et al. |
| 5,999,196 A | 12/1999 | Storm et al. |
| 6,002,409 A | 12/1999 | Harkin |
| 6,018,350 A | 1/2000 | Lee et al. |
| 6,023,738 A | 2/2000 | Priem et al. |
| 6,025,853 A | 2/2000 | Baldwin |
| 6,028,611 A | 2/2000 | Anderson et al. |
| 6,037,949 A | 3/2000 | DeRose et al. |
| 6,057,852 A | 5/2000 | Krech, Jr. |
| 6,092,124 A | 7/2000 | Priem et al. |
| 6,173,367 B1 | 1/2001 | Aleksic et al. |
| 6,181,352 B1 | 1/2001 | Kirk et al. |
| 6,198,488 B1 | 3/2001 | Lindholm et al. |
| 6,226,012 B1 | 5/2001 | Priem et al. |
| 6,252,608 B1 * | 6/2001 | Snyder et al. ............... 345/473 |

FOREIGN PATENT DOCUMENTS

| | | |
|---|---|---|
| EP | 1 075 146 | 2/2001 |
| EP | 1 081 649 | 3/2001 |
| JP | 11053580 | 2/1999 |
| JP | 11076614 | 3/1999 |
| JP | 11161819 | 6/1999 |
| JP | 11203500 | 7/1999 |
| JP | 11226257 | 8/1999 |
| JP | 11259671 | 9/1999 |
| JP | 11259678 | 9/1999 |
| JP | 2000-66985 | 3/2000 |
| JP | 2000-92390 | 3/2000 |
| JP | 2000-132704 | 5/2000 |
| JP | 2000-132706 | 5/2000 |
| JP | 2000-149053 | 5/2000 |
| JP | 2000-156875 | 6/2000 |
| JP | 2000-182077 | 6/2000 |
| JP | 2000-207582 | 7/2000 |
| JP | 2000-215325 | 8/2000 |
| WO | WO 94/10641 | 5/1994 |

OTHER PUBLICATIONS

Debevec, Paul, et al., "Efficient View–Dependent Image-–Based Rendering with Projective Texture–Mapping," University of California at Berkeley.

Gibson, Simon, et al., "Interactive Rendering with Real-–World Illumination," Rendering Techniques 2000; 11$^{th}$ Eurographics Workshop on Rendering, pp. 365–376 (Jun. 2000).

Wang, Yulan, et al., "Second–Depth Shadow Mapping," Dept. of Computer Science, University of North Carolina, Chapel Hill, NC.

Segal, Mark, et al., "Fast Shadows and Lighting Effects Using Texture Mapping," Computer Graphics, 26, 2, pp.. 249–252 (Jul. 1992).

White paper, Kilgard, Mark J., "Improving Shadows and Reflections via the Stencil Buffer" (Nov. 3, 1999).

"OpenGL Projected Textures," from web site:http://reality.sgi.com, 5 pages.

"5.13.1 How to Project a Texture," from web site: www.sgi.com, 2 pages.

Arkin, Alan, email, subject: "Texture distortion problem," from web site: http://reality.sig.com (Aug. 1997).

Moller, Tomas et al., "Real–Time Rendering," pp. 179–183 (AK Peters Ltd., 1999).

Williams, Lance, "Casting Curved Shadows on Curved Surfaces," *Computer Graphics* (SIGGRAPH '78 Proceedings), vol. 12, No. 3, pp. 270–274 (Aug. 1978).

Woo et al., "A Survey of Shadow Algorithms," *IEEE Computer Graphics and Applications,* vol. 10, No. 6, pp. 13–32 (Nov. 1990).

Heidrich et al., "Applications of Pixel Textures in Visualization and Realistic Image Synthesis," *Proceedings 1999 Symposium On Interactive 3D Graphics,* pp. 127–134 (Apr. 1999).

Hourcade et al, "Algorithms for Antialiased Cast Shadows", *Computers and Graphics,* vol. 9, No. 3, pp. 259–265 (1985).

Photograph of Sony PlayStation II System.

Photograph of Sega Dreamcast System.

Photograph of Nintendo 64 System.

Whitepaper: 3D Graphics Demystified, Nov. 11, 1999, www.nvidia.com.

Whitepaper: "Z Buffering, Interpolation and More W–Buffering", Doug Rogers, Jan. 31, 2000, www.nvidia.com.

Whitepaper: Using GL_NV_vertex_array and GL_NV_fence, posted Aug. 1, 2000, www.nvidia.com.

Whitepaper: Anisotropic Texture Filtering in OpenGL, posted Jul. 17, 2000, www.nvidia.com.

Whitepaper: Mapping Texels to Pixels in D3D, posted Apr. 5, 2000, www.nvidia.com.

Whitepaper: Guard Band Clipping, posted Jan. 31, 2000, www.nvidia.com.

Whitepaper: Cube Environment Mapping, posted Jan. 14, 2000, www.nvidia.com.

Whitepaper: Color Key in D3D, posted Jan. 11, 2000, www.nvidia.com.

Whitepaper: Vertex Blending Under DX7 for the GeForce 256, Jan. 5, 2000, www.nvidia.com.

Whitepaper: Optimizing Direct3D for the GeForce 256, Jan. 3, 2000, www.nvidia.com.

Whitepaper: Dot Product Texture Blending, Dec. 3, 1999, www.nvidia.com.

Whitepaper: Technical Brief: AGP 4X with Fast Writes, Nov. 10, 1999, www.nvidia.com.

Technical Brief: Transform and Lighting, Nov. 10, 1999, www.nvidia.com.
Technical Brief: What's New With Microsoft DirectX7, posted Nov. 10, 1999, www.nvidia.com.
Mitchell et al., "Multitexturing in DirectX6", Game Developer, Sep. 1998, www.gdmag.com.
VisionTek, "GeForce2 GS Graphics Processing Unit", ©2000 www.visiontek.com.
Jim Bushnell et al. "Advanced Multitexture Effects With Direct3D and OpenGL", Pyramid Peak Design & ATI Research, Inc., GameDevelopers Conference, ©1999.
Sony PlayStation II Instruction Manual, Sony Computer Entertainment Inc., ©2000.
Stand and Be Judged, Next Generation, May 2000.
PlayStation II: Hardware Heaven or Hell?, Next Generation, Jan. 2000.
Chris Charla, "Play Station II: The Latest News", Next Generation, Sep. 1999.
"First PlayStation II Gameplay Screens Revealed!", Next Generation, Sep. 1999.
Game Enthusiast Online Highlights, Mar. 18, 1999.
Game Enthusiast Online Highlights, Mar. 19, 1999.
Game Enthusiast Online Highlights, Mar. 17, 1999.
Game Enthusiast Online Highlights, Oct. 20, 1999.
Joel Easley, "PlayStation II Revealed", Game Week, Sep. 29, 1999.
Inside Sony's Next Generation Playstation, ©1999.
Press Releases, Mar. 18, 1999.
Chris Johnston, "Playstation Part Deux", Press Start, ©1999.
Nikkei Shimbun, "Sony Making SME, Chemical and SPT into Wholly–Owned Subsidiaries", Mar. 9, 1999.
AM News: Japanese Developers Not All Sold on PS2, Next Generation, Mar. 16, 1999.
Sony To Turn PlayStation Maker Into Wholly Owned Unit––Nikkei, Dow Jones News Service, Mar. 8, 1999.
Yumiko Ono, Sony Antes Up Its Chips In Bet On New Game System, Dow Jones News Service, Mar. 4, 1999.
MacWeek.Com Gets Inside Story on Connectix VGS for Windows; Controversial Emulator of Sony PlayStation Games Cureently Available for Macs Only, Business Wire, Mar. 12, 1999.
"DexDrive Bridges Gap", The Tampa Tribune, Mar. 12, 1999.
A Microprocessor With a 128b CPU, 10 Floating–Point MAC's, 4 Floating–Point Dividers, and an MPEG2 Decoder, 1999 IEEE International Solid–State Circuits Conference, Feb. 16, 1999.
Dreamcast Instruction Manual, Sega Enterprises, Ltd., ©1998.
Sega To Launch Video Camera for Dreamcast, Reuters Business News, Feb. 16, 2000.
David Pescovitz, "Dream On", Wired, Aug. 1999.
Randy Nelson, "Dreamcast 101: Everything You Ever Wanted To Know About Sega's Powerful New Console", Official Sega Dreamcast Magazine, Jun. 1999.
2D/3D Graphics Card User Manual, Guillemot ©1999.
Nintendo 64 Instruction Booklet, Nintendo of America, 1998.
Steven Levy, "Here Comes PlayStation II", Newsweek, Mar. 6, 2000.
David Sheff, "Sony Smackage: Test Driving The PlayStation II", Wired, Nov. 1999.
Introducing The Next Generation PlayStation, Sony Computer Engtertainment Inc., ©1999.

Leadtek GTS, Aug. 3, 2000, www.hexus.net.
Voodoo 5 5500 Review, Jul. 26, 2000, www.hexus.net.
ATI Radeon 64 Meg DDR OEM, Aug. 19, 2000, www.hexus.net.
Microsoft Xbox—The Future of Gaming, Microsoft Xbox Performance Sheet, www.xbox.com.
Robert L. Cook, "Shade Trees", Computer Graphics, vol. 18, No. 3, Jul. 1984.
Wang et al., "Second–Depth Shadow Mapping", Department of Computer Science, Univ. N.C, Chapel Hill, N.C. pp. 1–7.
Peercy et al., "Efficient Bump Mapping Hardware", Computer Graphics Proceedings, Annual Conference Series, 1997.
Gustavo Oliveira, "Refractive Texture Mappig, Part One", www.gamasutra.com, Nov. 10, 2000.
John Schlag, Fast Embossing Effects on Raster Image Data, Graphics Gems IV, Edited by Paul S. Heckbert, Computer Science Department, Carnegie Mellon University, Academic Press, Inc., 1994, pp. 433–437.
James F. Blinn, "Simulationof Wrinkled Surfaces," Caltech/JPL, pp. 286–292, SIGGRAPH 78 (1978).
Tomas Möller and Eric Haines "Real–Time Rendering", AK Peters, Ltd., ©1999, pp. 127–142.
Technical Presentation: Vertex Buffers, posted Jun. 12, 2000, www.nvidia.com.
Technical Presentation: Hardware Transform and Lighting, www.nvidia.com, posted Jun. 12, 2000.
Technical Presentation: Hardware Bump–mapping Choices and Concepts, Jun. 7, 2000, www.nvidia.com.
Technical Presentation: How to Bump Map a Skinned Polygonal Model, Jun. 7, 2000, www.nvidia.com.
Technical Presentation: Computations for Hardware Lighting and Shading, Mar. 17, 2000, www.nvidia.com.
Technical Presentation: Practical Bump–mapping for Today's GPUs, Mar. 17, 2000 www.nvidia.com.
Technical Presentation: Shadows, Transparency & Fog, Mar. 17, 2000 www.nvidia.com.
Technical Presentation: GeForce 256 Register Combiners, Mar. 17, 2000, www.nvidia.com.
Technical Presentation: TexGen & The Texture Matrix, Mar. 15, 2000 www.nvidia.com.
Technical Presentation: Toon Shading, Mar. 15, 2000, www.nvidia.com.
Technical Presentation: D3D 7 Vertex Lighting, Mar. 15, 2000, www.nvidia.com.
Technical Presentation: Per–Pixel Lighting (by S. Dietrich) Mar. 14, 2000 www.nvidia.com.
Technical Presentation: GeForce 256 and RIVA TNT Combiners, Dec. 8, 1999, www.nvidia.com.
Technical Presentation: Vertex Cache Optimization, Nov. 12, 1999, www.nvidia.com.
Technical Presentation: Vertex Blending, Nov. 12, 1999, www.nvidia.com.
Technical Presentation: Hardware Transform and Lighting, Nov. 12, 1999, www.nvidia.com.
Technical Presentation: GeForce 256 Overview, Nov. 12, 1999, www.nvidia.com.
Technical Presentation: DirectX 7 and Texture Management, Nov. 12, 1999 www.nvidia.com.
Technical Presentation: Dot Product Lighting, Nov. 12, 1999, www.nvidia.com.
Technical Presentation: Texture Coordinate Generation, Nov. 3, 1999, www.nvidia.com.

Technical Presentation: Phong Shading and Lightmaps, Nov. 3, 1999, www.nvidia.com.
Technical Presentation: The ARB_multitexture Extension, Nov. 3, 1999 www.nvidia.com.
Technical Presentation: Multitexture Combiners, Nov. 3, 1999, www.nvidia.com.
Technical Presentation: Emboss Bump Mapping, Nov. 3, 1999, www.nvidia.com.
Technical Presentation: Hardware Accelerated Anisotropic Lighting, Nov. 3, 1999 www.nvidia.com.
Technical Presentation: Guard Band Clipping, Nov. 3, 1999, www.nvidia.com.
The RenderMan Interface, Stephan R. Keith, Version 3.1, Pixar Animation Studios, Sep. 1989.
The RenderMan Interface, version 3.2, Pixar Animation Studios, Jul. 2000, www.pixar.com.
NVIDIA Product Overview, "GeForce2Ultra", NVIDIA Corporation, Aug. 21, 2000, www.nvidia.com.
Duke, "Dreamcast Technical Specs", Sega Dreamcast Review, Sega, Feb. 1999, www.game-revolution.com.
Marlin Rowley, "GeForce 1 & 2 GPU Speed Tests", May 11, 2000, www.g256.com.
"Dreamcast: The Full Story", Next Generation, Sep. 1998.

DirectX 7.0 Programmer's Reference, Microsoft Corportaion, 1995–1999 (as part of the DirectX 7.0 SDK on the Companion CD included with "Inside Direct3D", Microsoft Programming Series, Peter J. Kovach, Microsoft Press, 1999).
"Inside Direct3D", Microsoft Programming Series, Peter J. Kovach, Microsoft Press, 1999.
"OpenGL Programming Guide, The Official Guide to Learning OpenGL, Release 1", Jackie Nieder, Tom David, Mason Woo, Addision–Wesley Publishing Co., 1993.
"Procedural Elements for Computer Graphics," Second Edition, David F. Rogers, McGraw Hill, 1998.
"Real–Time Rendering," Tomas Molleir, Eric Haines, AK Peters, 1999.
"Computer Graphics, Principles and Practice," Second Edition, The Systems Programming Series, Foley, van Dam, Fiener, Hughes, Addison Wesley, 1990.
"Principles of Three–Dimensional Computer Animation", Revised Edition, Michael O'Rourke, W.W. Norton & Company, 1998.

* cited by examiner

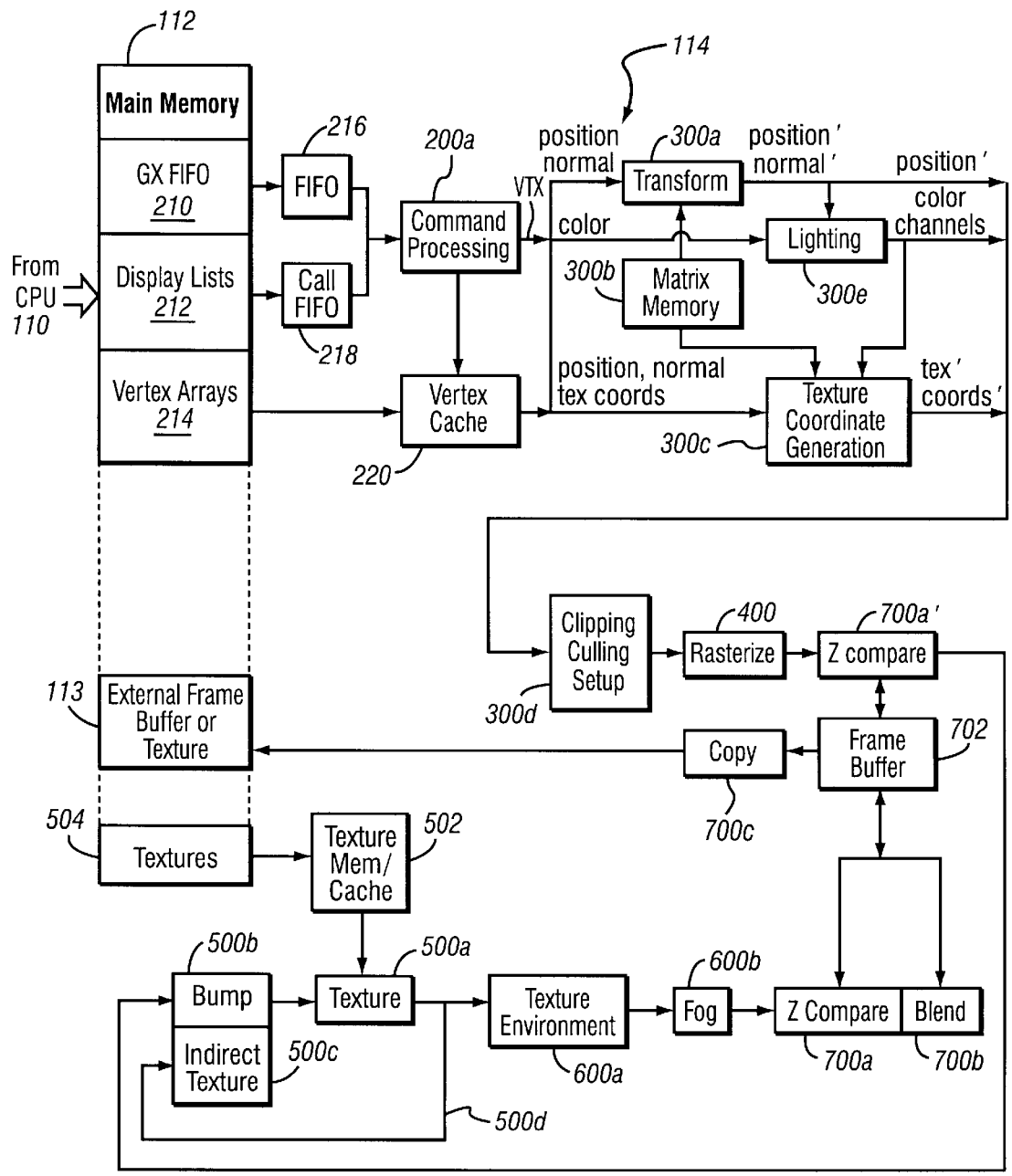
Fig. 5  EXAMPLE GRAPHICS PROCESSOR FLOW

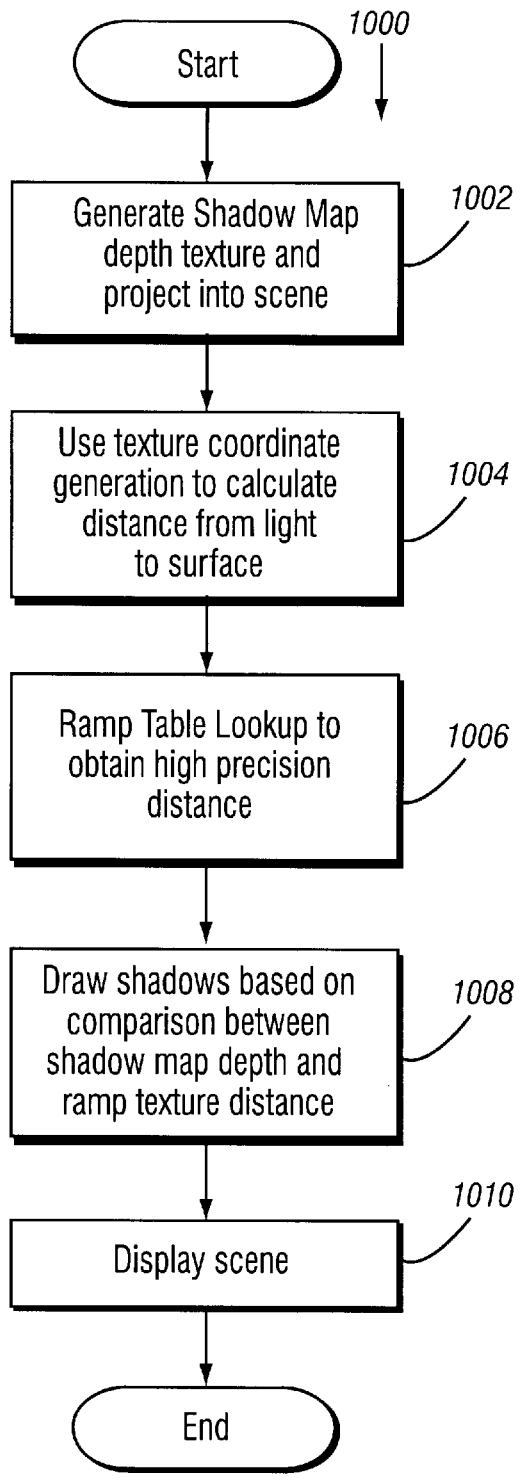
Fig. 6   EXAMPLE SHADOW MAPPING PROCEDURE

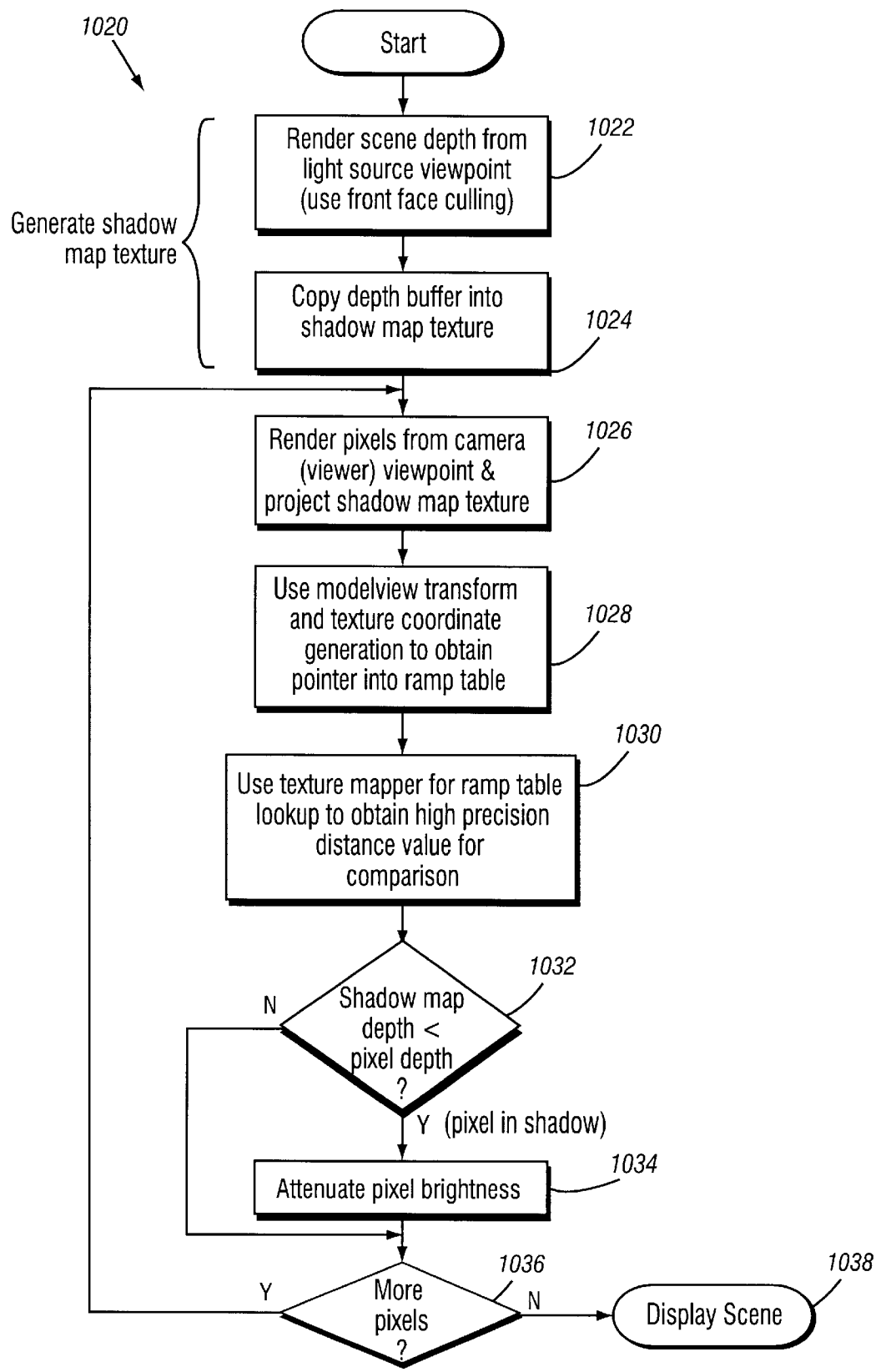
Fig. 7 EXAMPLE MORE DETAILED SHADOW MAPPING PROCEDURE

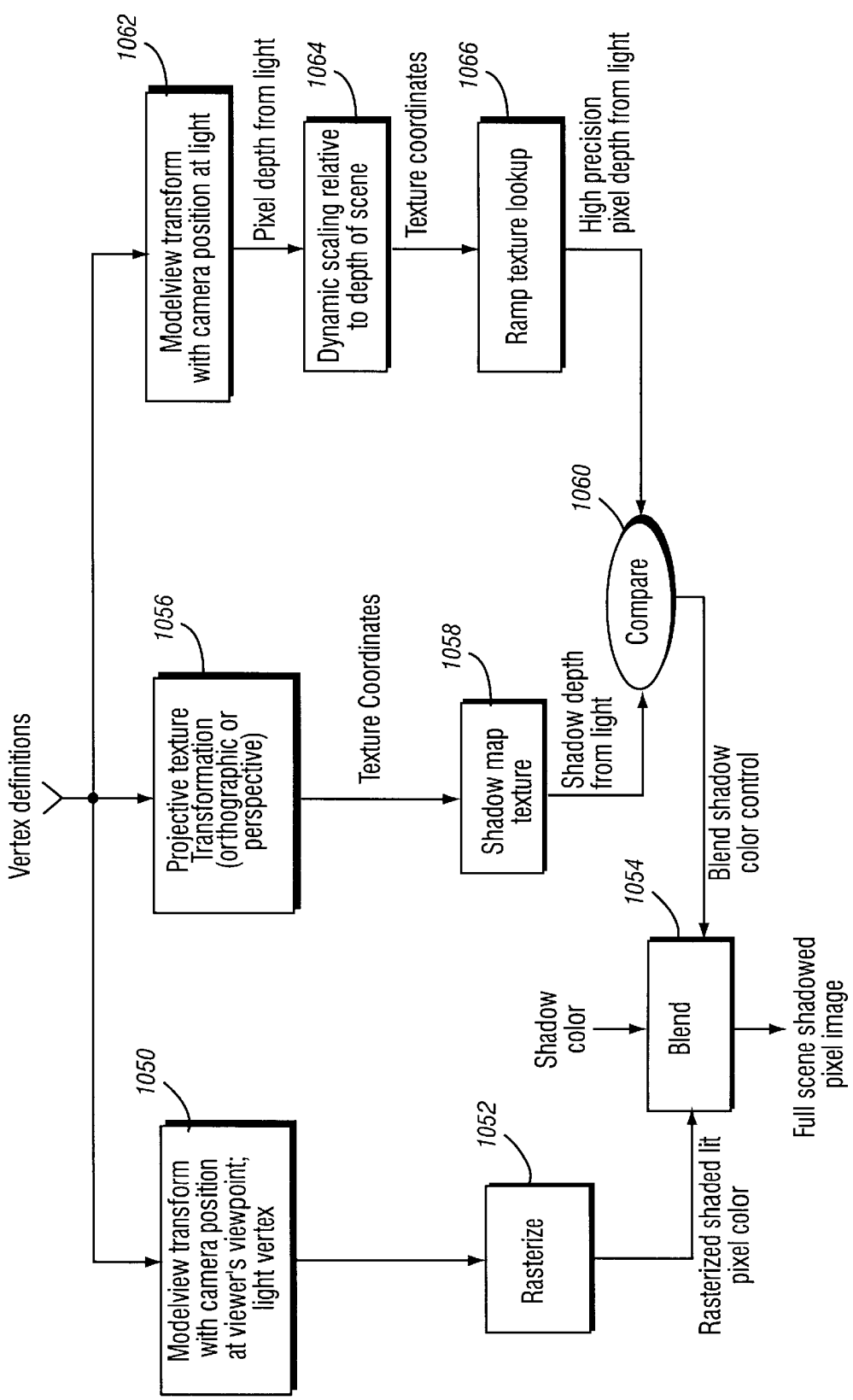
Fig. 8 EXAMPLE SECOND PASS PIPELINE PROCESSING

Fig. 9A EXAMPLE RAMP TEXTURE

| 00 | 10 | 20 | --- | F0 |
| 01 | 11 | 21 | --- | F1 |
| --- | --- | --- | --- | --- |
| 0F | 1F | 2F | --- | FF |

S →
T ↓

For 8 bit
16 x 16/I8 Format

Fig. 9B EXAMPLE RAMP TEXTURE

| 0000 | 0100 | 0200 | --- | FF00 |
| 0001 | 0101 | 0201 | --- | FF01 |
| --- | --- | --- | --- | --- |
| 00FF | 01FF | 02FF | --- | FFFF |

For 16 bit
256 x 256/IA8 Format

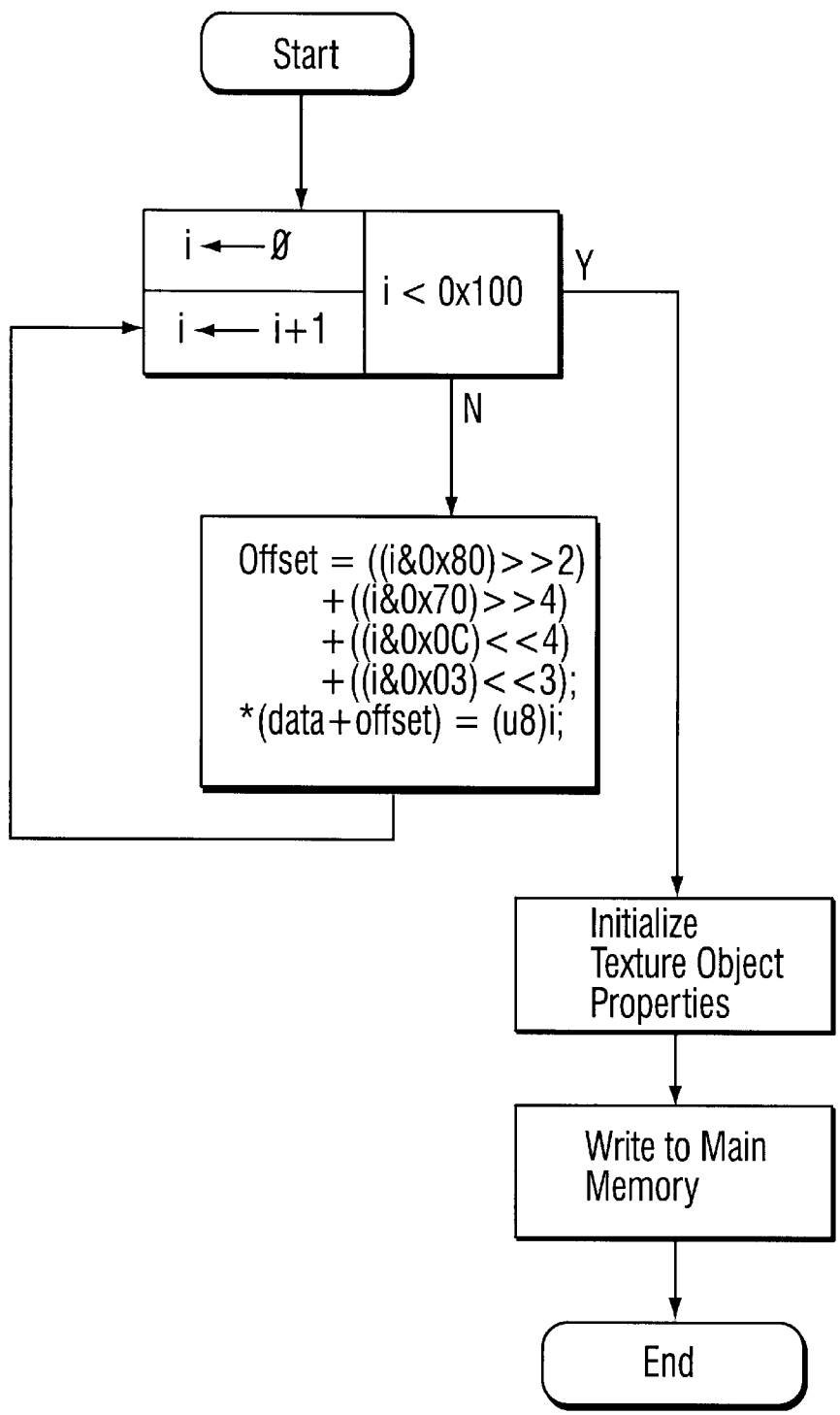
Fig. 10 EXAMPLE PROCESS FOR GENERATING RAMP TEXTURE

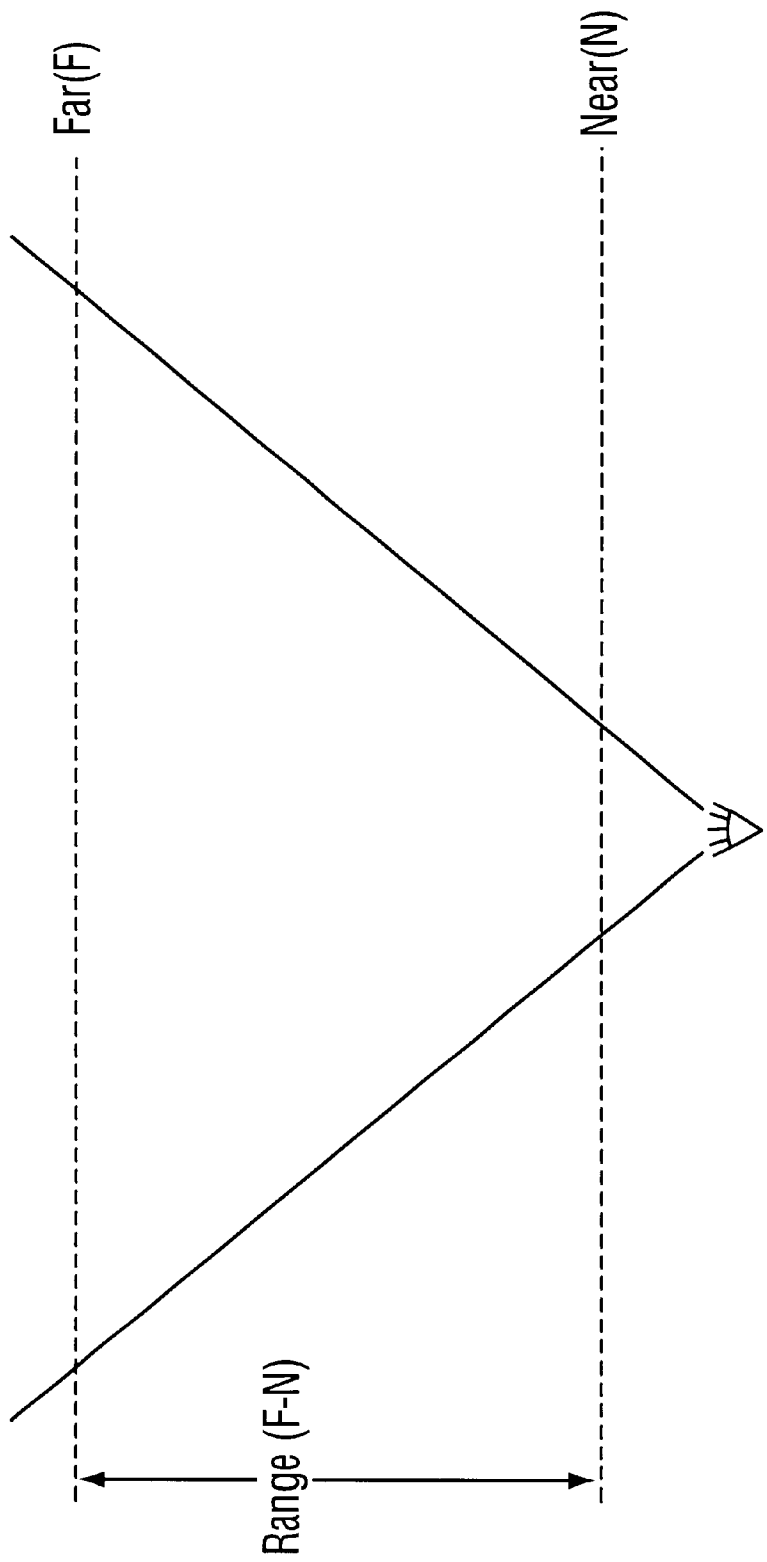
Fig. 11 EXAMPLE CAMERA DEPTH RANGE PARAMETERS

Fig. 12B EXAMPLE RAMP TEXTURE

Fig. 12A EXAMPLE RAMP TEXTURE

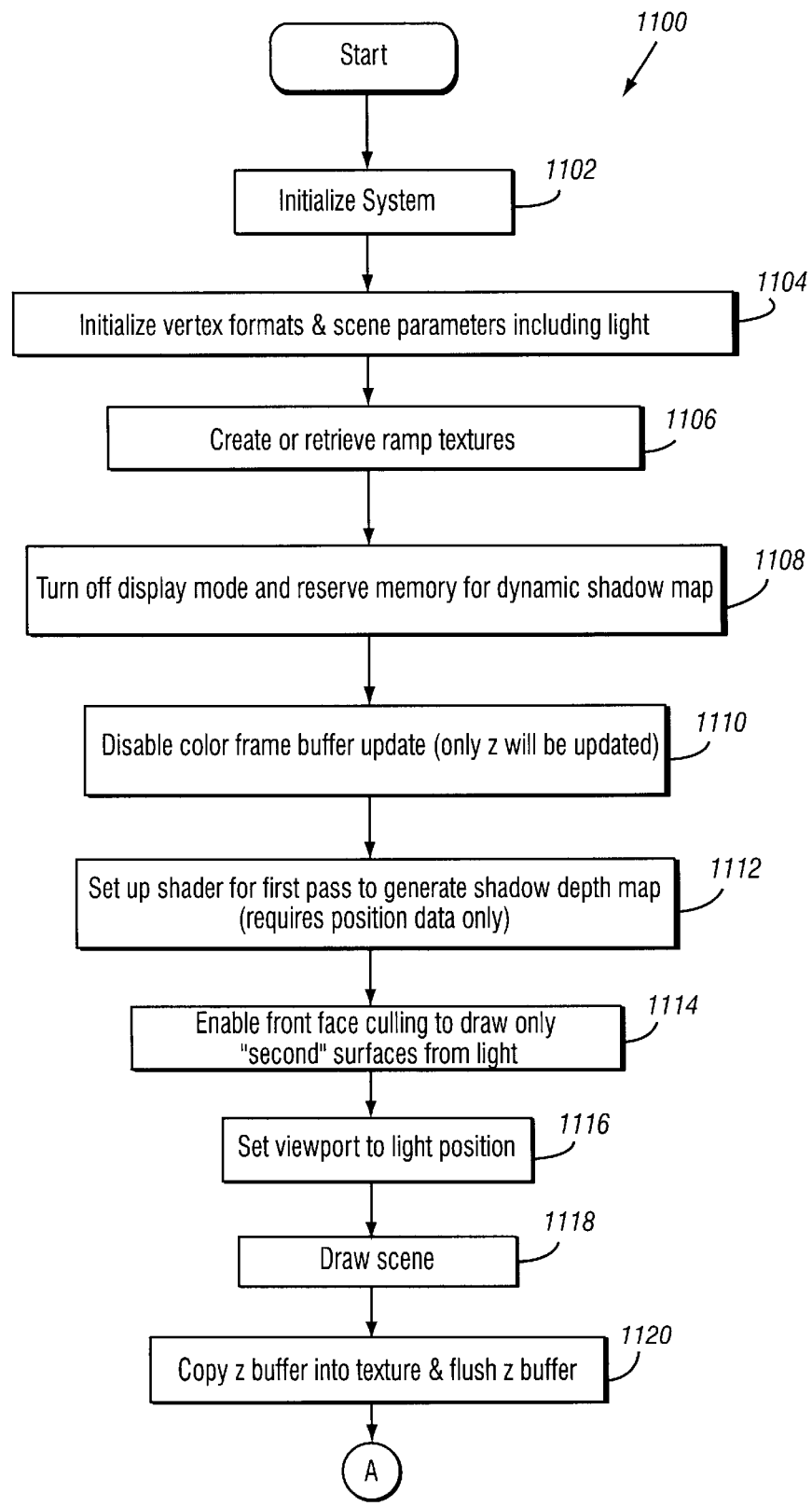
Fig. 13A EXAMPLE IMPLEMENTATION

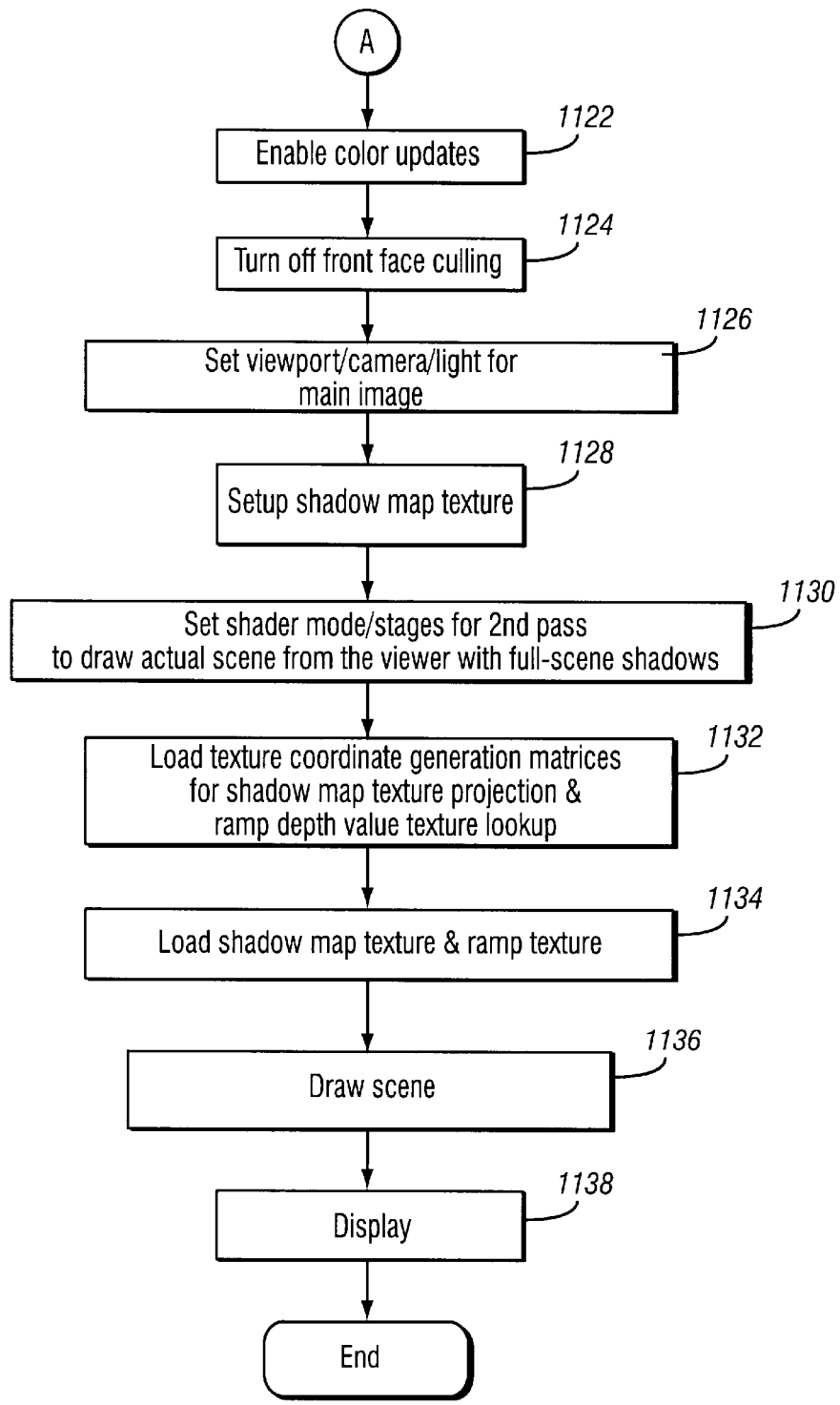
Fig. 13B  EXAMPLE IMPLEMENTATION

Fig. 14 EXAMPLE SHADER STAGES
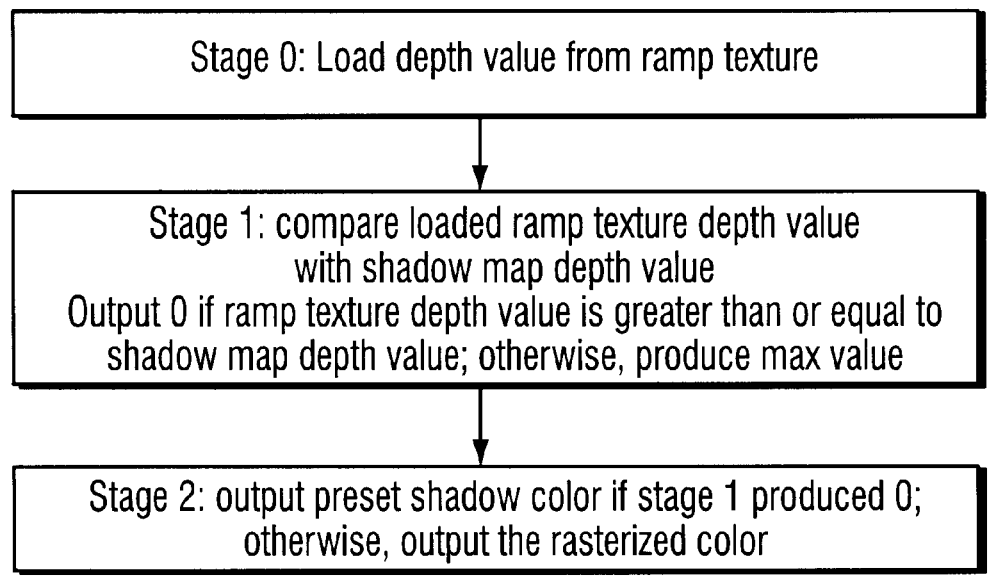

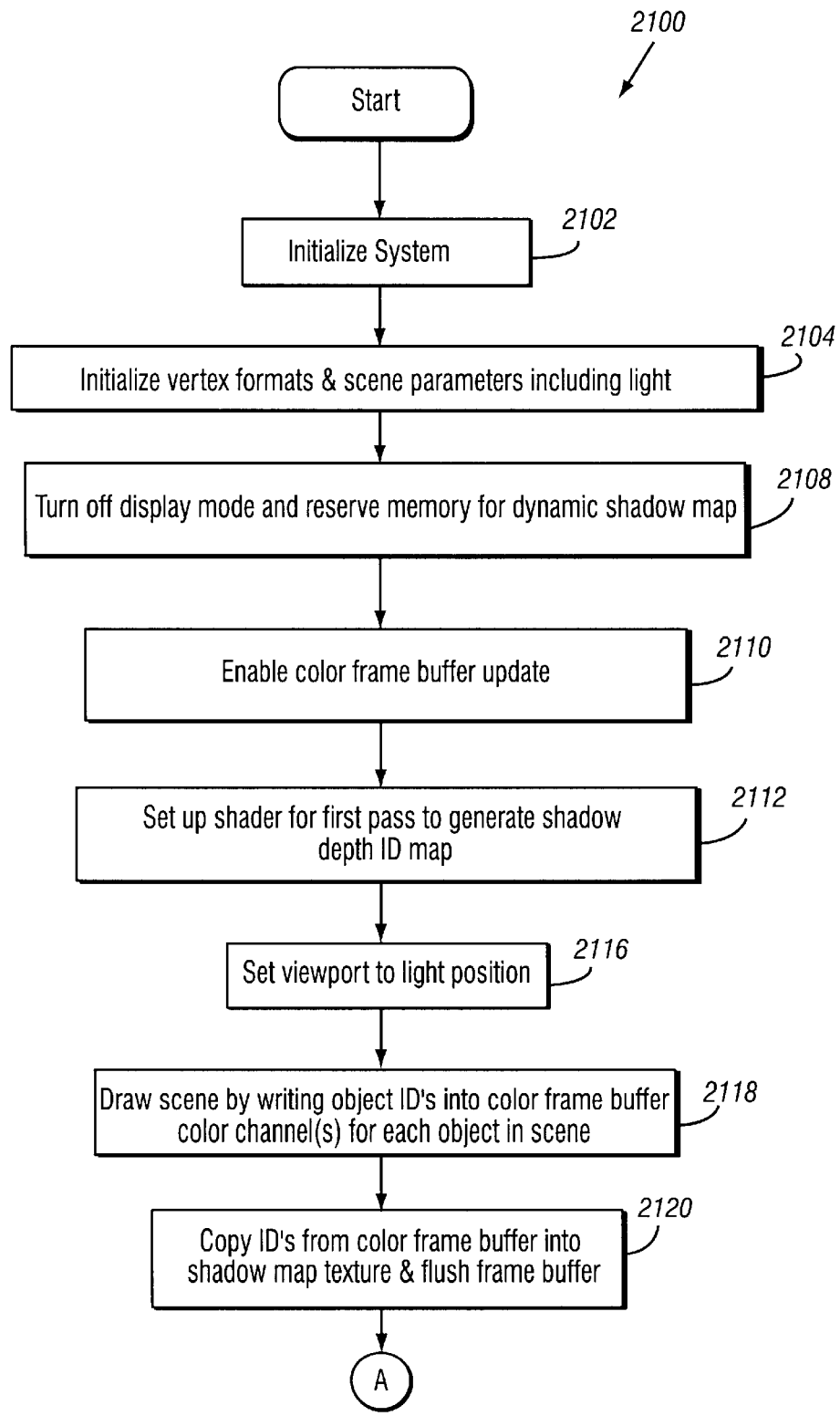
Fig. 16A  EXAMPLE ID SHADOW MAP PROCEDURE

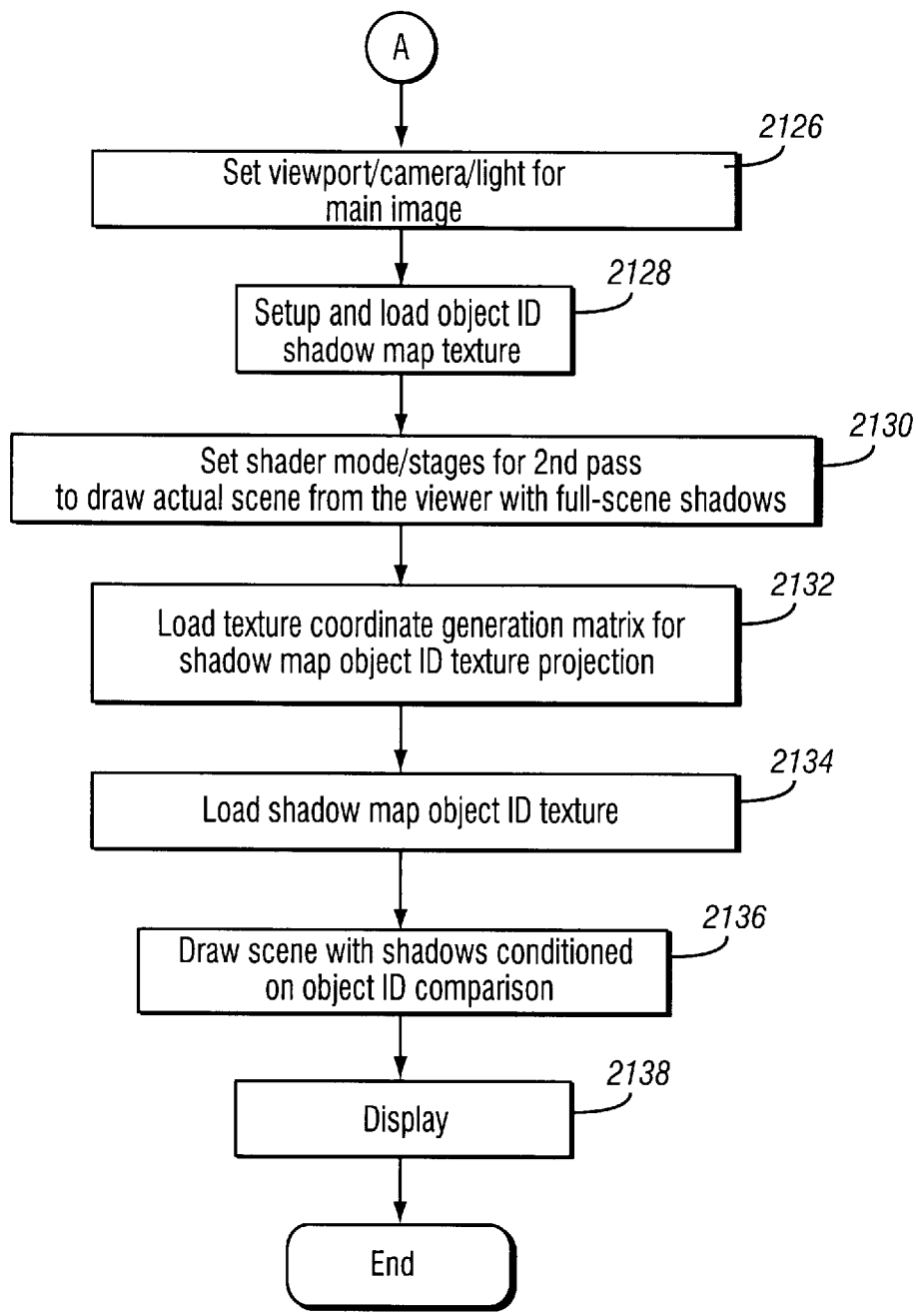
Fig. 16B EXAMPLE ID SHADOW MAP PROCEDURE

SHADOW MAPPING IN A LOW COST GRAPHICS SYSTEM

This application claims the benefit of U.S. Provisional Application No. 60/227,006, filed Aug. 23, 2000, the entire content of which is hereby incorporated by reference in this application.

FIELD OF THE INVENTION

The present invention relates to computer graphics, and more particularly to interactive graphics systems such as home video game platforms. Still more particularly, this invention relates to techniques for generating shadows using full scene shadow mapping in a low cost graphics system, and to use of graphics pipeline texture coordinate generation and/or texture mapping arrangements to generate precision numerical values supporting shadow comparisons and other effects.

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as, for example, the Nintendo 64® and various 3D graphics cards now available for personal computers. It is now possible to interact with exciting 3D animations and simulations on relatively inexpensive computer graphics systems in your home or office.

Shadows are important for creating realistic images and providing the viewer with visual cues about where objects appear relative to one another. Many different shadowing techniques are known. See, for example, Woo et al., "A Survey of Shadow Algorithms," *IEEE Computer Graphics and Applications*, Volume 10, Number 6, pages 13–32 (November 1990).

A problem graphics system designers confronted in the past was how to draw shadows using low cost graphics systems. One known technique for accomplishing this is called shadow mapping. This technique allows a common z-buffer-based renderer to be used to generate shadows quickly on arbitrary objects. See Williams "Casting Curved Shadows on Curved Surfaces," *Computer Graphics (SIGGRAPH '78 Proceedings)*, Volume 12, Number 3, pages 270–274 (August 1978). Using this technique, the graphics system renders the scene using the z-buffer algorithm with respect to the position and direction of the light source. For each pixel in the z buffer, the resulting rendered z depth contains the distance to the object that is closest to the light source. This depth map is called a shadow map. The scene is then rendered a second time, but this time with respect to the viewer (camera). As each drawing primitive is being rendered, its location (depth from the light) is compared to the shadow map. If a rendered point is further away from the light source than the value in the shadow map, that point is in shadow and its brightness is attenuated. If the rendered point is closer to the light source than the shadow map value, the point is illuminated by the light and is not in shadow.

One efficient way to implement this shadow mapping technique is by exploiting texture mapping hardware to project the shadow map into the scene. See, e.g., Heidrich et al., "Applications of Pixel Textures in Visualization and Realistic Image Synthesis," *Proceedings* 1999 *Symposium On Interactive* 3D *Graphics,* pages 127–134 (April 1999); Segal et al., "Fast Shadows and Lighting Effects Using Texture Mapping," *Computer Graphics (SIGGRAPH '92 Proceedings,* Volume 26, Number 2, pages 249–252 (July 1992). Using these techniques, the shadow map can be generated using z buffering (that is, lighting, texturing and the writing of color values into the color buffer can be turned off). Then, the scene is rendered from the viewer using only ambient lighting to resolve visibility. A shadow testing step is then performed to compare the z value in the z buffer with the z value (which is transformed from the coordinate system of the light source into the coordinate system of the viewer) in the shadow map. One technique is to set an additional value in the frame buffer for each pixel based on the result of the shadow comparison at that pixel. The whole scene is then rendered using the entire lighting equation— with the final color of each pixel being the color from the ambient lighting pass plus the color from the full rendering pass multiplied by the additional value in the frame buffer.

An extension of Williams' shadow mapping technique proposed by Wang et al., "Second-Depth Shadow Mapping" (Department of Computer Science, University of North Carolina at Chapel Hill) solves certain self-shadowing problems (where a surface may cast a shadow onto itself due to lack of precision in the shadow comparison) by performing the shadow comparison based on the depth of a second surface defined by a primitive. Wang et al thus suggest using front-faced culling techniques to eliminate the first surface of primitives when generating the shadow map. This prevents limited precision depth comparisons from causing front surfaces to cast shadows upon themselves.

The above-described shadow mapping techniques allow general-purpose graphics hardware to render arbitrary shadows. However, using these techniques, the quality of the shadow produced depends on the resolution (in pixels) of the shadow map, and also on the numerical precision of the z buffer and the depth comparison. See Moller et al., *Real-Time Rendering,* pages 179–183 (AK Peters Ltd., 1999). Achieving adequate numerical precision for the depth comparison can be a problem for low cost graphics systems such as video game platforms. In full scene shadowing, any object can cast a shadow on any object (including itself). The number of bits of information used to encode the distance value will determine where the near and far planes can be on the projection from the light source, and how much depth complexity can be provided in the rendered shadow map. To find out whether a surface is in shadow or outside of shadow, a depth comparison is performed between the actual distance from the light to the surface being rendered, and the nearest distance from the light (determined by rendering the scene from the light source into the shadow map). The number of bits in this distance value will determine the range that a particular light can cast shadows into the scene. The lower the precision, the less depth complexity that can be provided on the shadows and on the light. Hence, lower precision can limit the number of shadows the light can cast into the scene and how far ranging those shadows can be.

If the graphics pipeline does not provide sufficient numerical precision for shadow mapping effects, higher precision depth values can usually be obtained by having the graphics system host processor perform necessary calculations under software control. However, this places substantial additional loading on the host processor, and may make it difficult or impossible to render full-scene shadows in real time within the context of an interactive animated computer graphics system that allows the user to change the position(s) of one or more objects within the scene at will.

Another way to get around the limited precision problem is to use a form of shadow mapping which does not attempt the shadow depth comparison, but works instead by identifying what is seen by the light. See, e.g., Hourcade et al, "Algorithms for Antialiased Cast Shadows", *Computers and Graphics*, vol. 9, no. 3, pp. 259–265 (1985). If an object is seen from the selected viewpoint and the shadow map indicates that the object is also seen by the light, then the object is illuminated. This technique has the advantage of avoiding the shadow depth comparison. However, areas where objects or polygons meet can be problematic. It is possible to resolve such problem areas by using different identifiers for different objects—although an object with a single identifier can never cast a shadow upon itself using this algorithm.

While much work has been done in the past, further improvements are possible.

The present invention solves the numerical precision problem while providing techniques and arrangements that perform full scene shadow mapping using low cost, limited precision hardware such as that found, for example, in home video game platforms and personal computer graphics accelerators.

One aspect of the invention uses a texture coordinate generator to assist in calculating distance between light position and a primitive surface at a precision that is based on the dynamic depth of the scene. A texture mapper uses the generated texture coordinates to look up a precision distance value from a ramp function stored as a texture. The resulting precision distance value can be compared with the corresponding depth value in the shadow map to determine whether or not the pixel is in shadow.

In one embodiment, the ramp function is stored as a 2-D texture in such a way that certain texels are redundant and not all texels are used. To eliminate lookup errors, redundant texel values are provided where the ramp function crosses texel row/column boundaries.

BRIEF DESCRIPTION OF THE DRAWINGS

These and other features and advantages provided by the invention will be better and more completely understood by referring to the following detailed description of presently preferred embodiments in conjunction with the drawings. The file of this patent contains at least one drawing executed in color. Copies of this patent with color drawing(s) will be provided by the Patent and Trademark Office upon request and payment of the necessary fee. The drawings are briefly described as follows:

FIG. 5 is an example logical flow diagram of the FIG. 4 graphics and audio processor;

FIG. 6 shows an example shadow mapping procedure;

FIG. 7 shows an example more detailed shadow mapping procedure;

FIG. 8 shows example second-pass shadow mapping pipeline processing;

FIGS. 9A and 9B show example ramp lookup tables;

FIG. 10 shows an example technique for dynamically generating the FIG. 9A ramp lookup table;

FIG. 11 shows an example scaling operation;

FIGS. 12A and 12B show further embodiments of example ramp lookup tables that eliminate errors by incorporating redundant lookup values;

FIGS. 13A and 13B show an example shadow mapping procedure implementation;

FIG. 14 shows example recirculating shader stage configuration;

FIG. 16 shows an example alternate shadow mapping technique based on IDs.

DETAILED DESCRIPTION OF EXAMPLE EMBODIMENTS OF THE INVENTION

Figure 1:
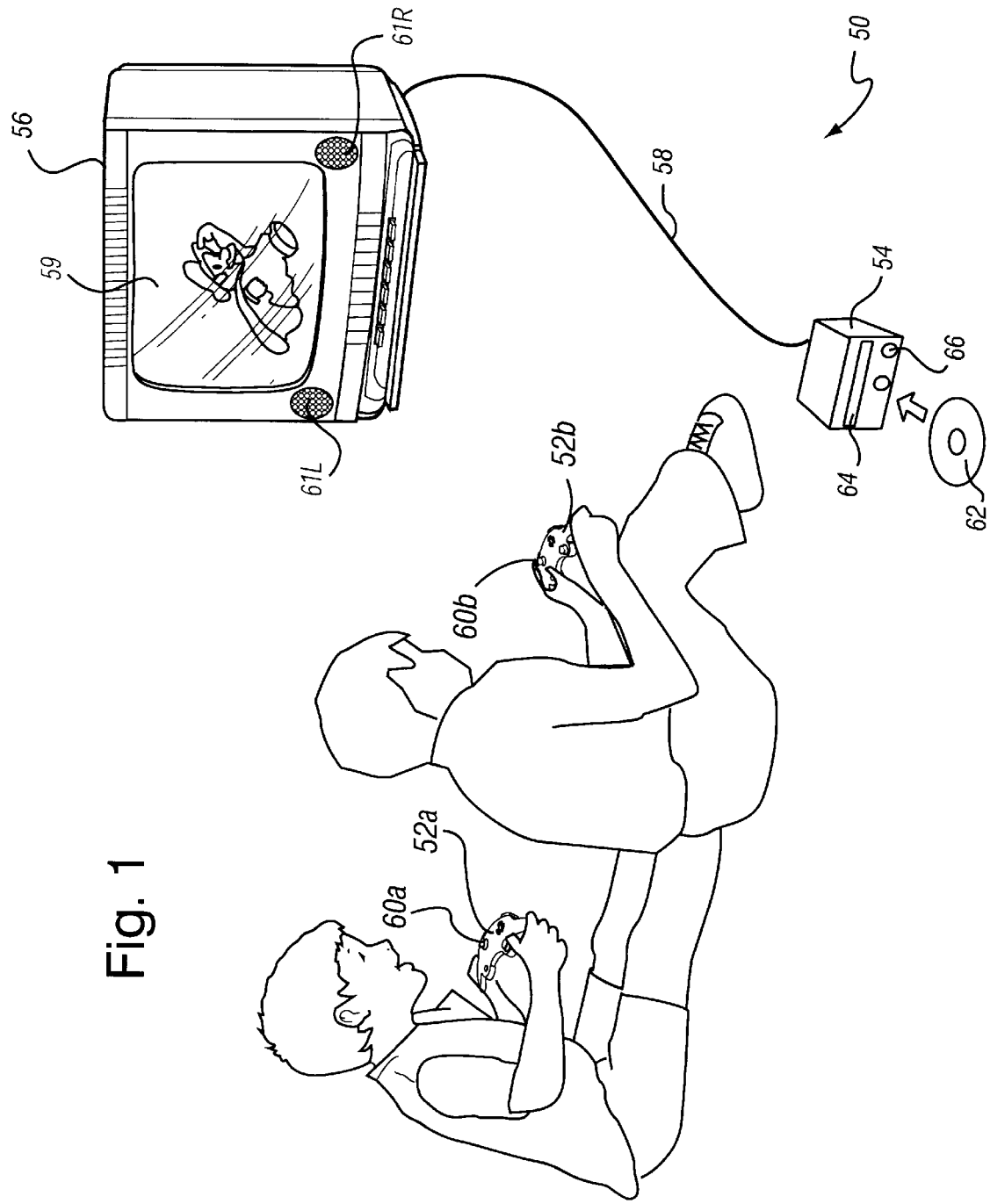
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 52*a*, 52*b* or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall System

Figure 2:
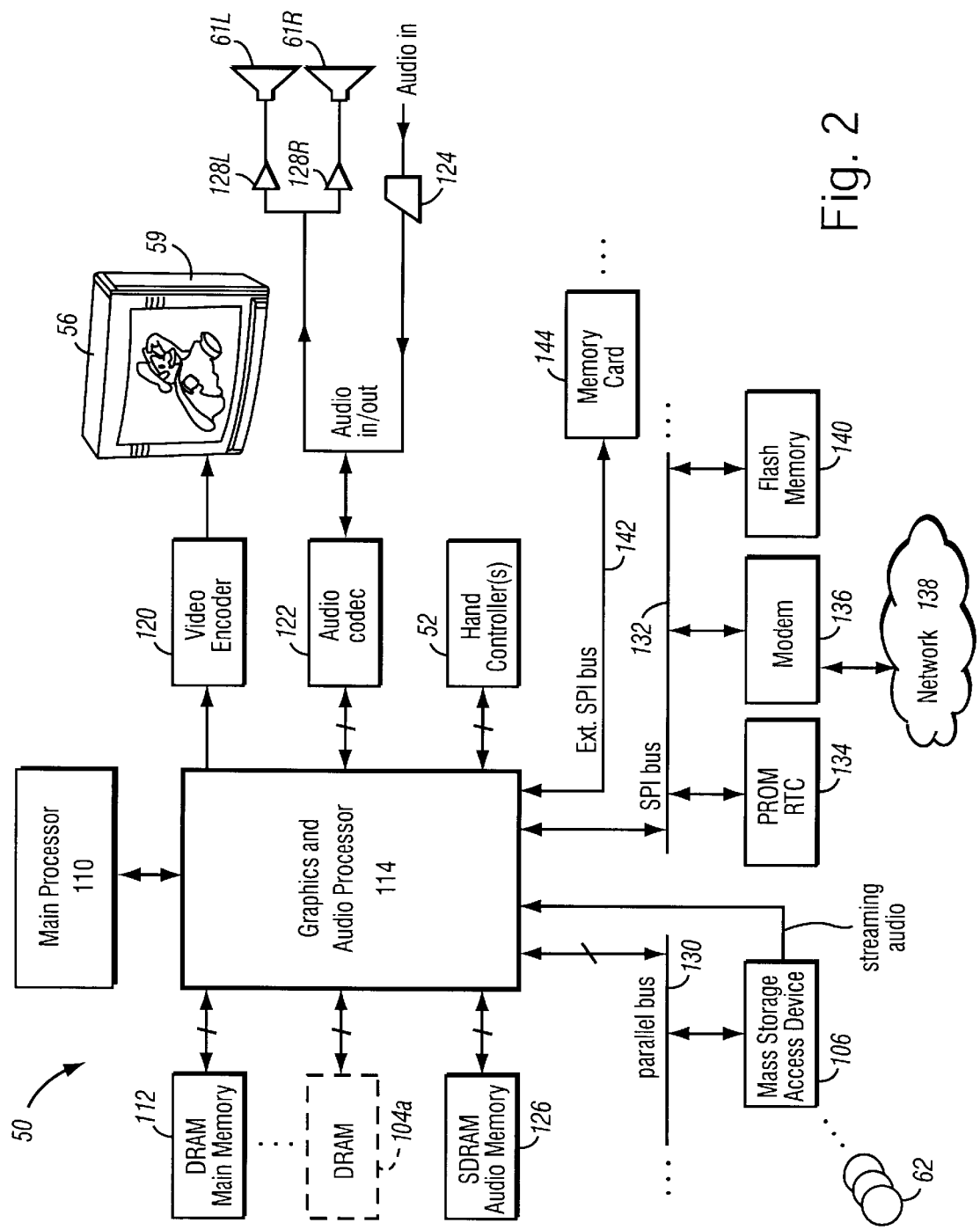
FIG. 2 is a block diagram of the FIG. 1 example computer graphics system.

FIG. 2 shows a block diagram of example components of system 50. The primary components include:

a main processor (CPU) 110, a main memory 112, and a graphics and audio processor 114.

In this example, main processor 110 (e.g., an enhanced IBM Power PC 750) receives inputs from handheld controllers 108 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61 L, 61 R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:

a programmable read-only memory and/or real time clock 134, a modem 136 or other networking interface (which may in turn connect system 50 to a telecommunications network 138 such as the Internet or other digital network from/to which program instructions and/or data can be downloaded or uploaded), and flash memory 140.

A further external serial bus 142 may be used to communicate with additional expansion memory 144 (e.g., a memory card) or other devices. Connectors may be used to connect various devices to busses 130, 132, 142.

Example Graphics And Audio Processor

Figure 3:
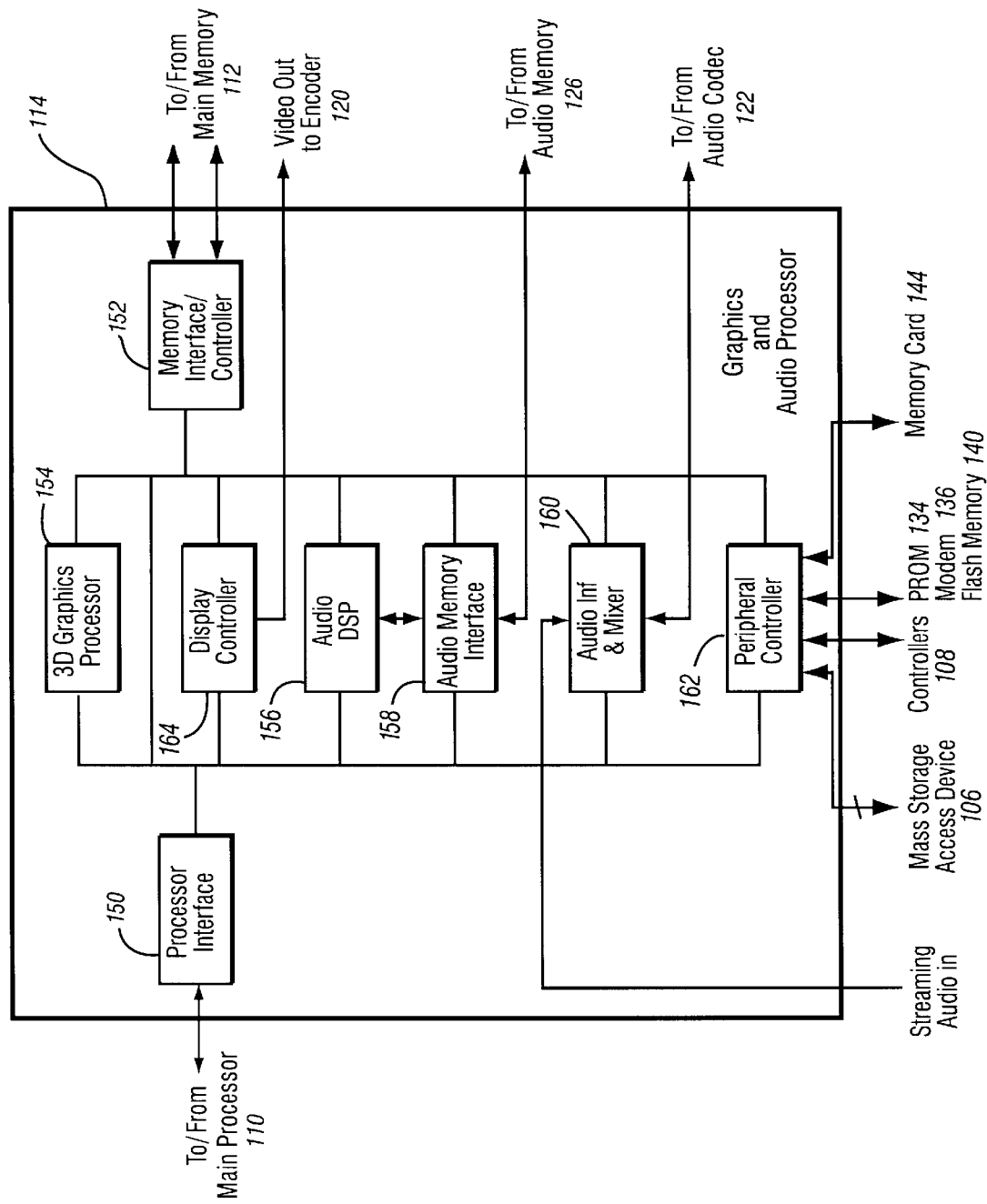
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:

a processor interface 150, a memory interface/controller 152, a 3D graphics processor 154, an audio digital signal processor (DSP) 156, an audio memory interface 158, an audio interface and mixer 160, a peripheral controller 162, and a display controller 164.

3D graphics processor 154 performs graphics processing tasks. Audio digital signal processor 156 performs audio processing tasks. Display controller 164 accesses image information from main memory 112 and provides it to video encoder 120 for display on display device 56. Audio interface and mixer 160 interfaces with audio codec 122, and can also mix audio from different sources (e.g., streaming audio from mass storage access device 106, the output of audio digital signal processor (DSP) 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
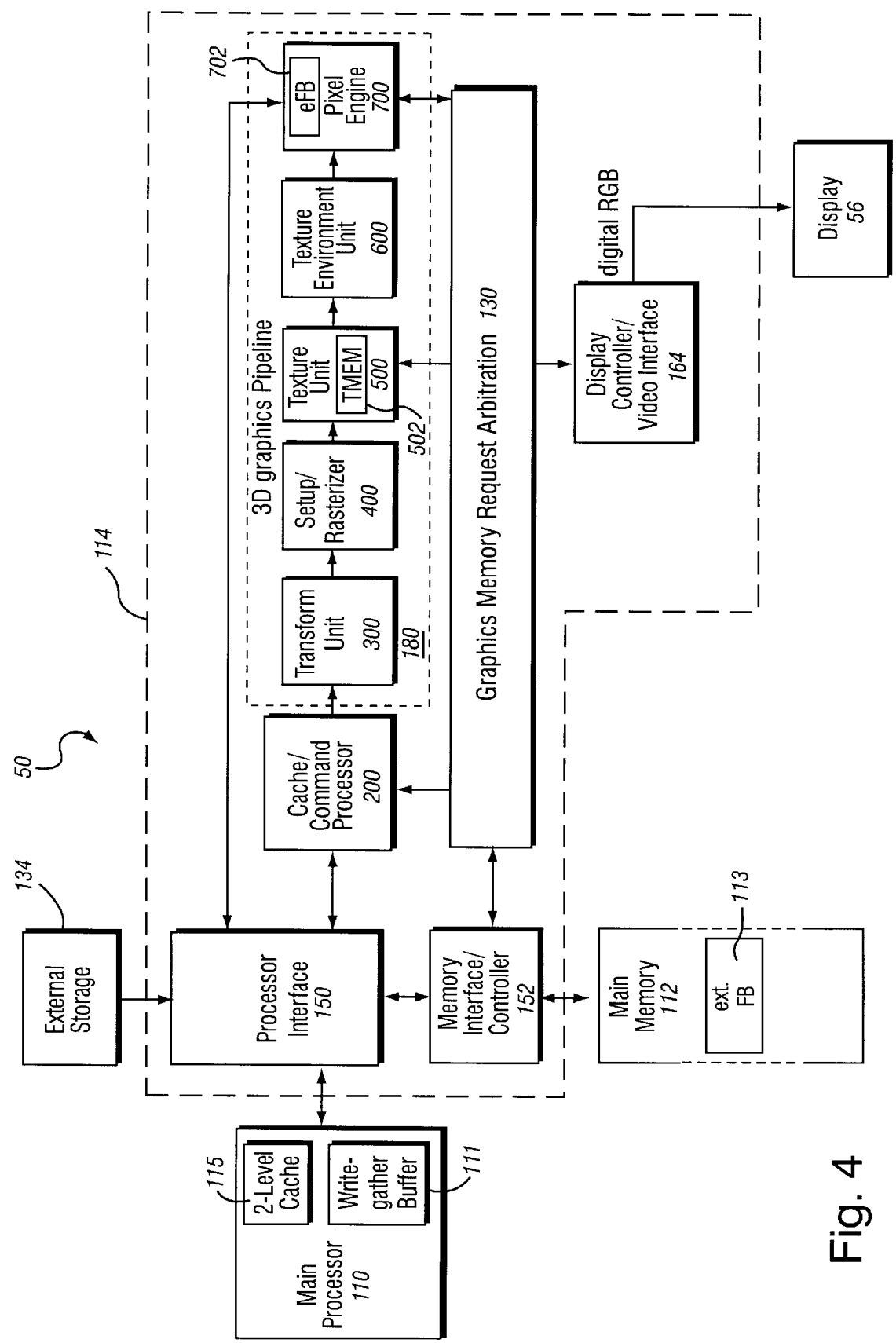
FIG. 4 is a block diagram of the example 3D graphics processor shown in FIG. 3.

FIG. 4 shows a more detailed view of an example 3D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache 115 to minimize memory latency, and also has a write-gathering buffer 111 for uncached data streams targeted for the graphics and audio processor 114. The write-gathering buffer 111 collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164—which displays the frame buffer output of pipeline 180 on display 56.

FIG. 5 is a logical flow diagram of graphics processor 154. Main processor 110 may store graphics command streams 210, display lists 212 and vertex arrays 214 in main memory 112, and pass pointers to command processor 200 via bus interface 150. The main processor 110 stores graphics commands in one or more graphics first-in-first-out (FIFO) buffers 210 it allocates in main memory 110. The command processor 200 fetches:

- command streams from main memory 112 via an on-chip FIFO memory buffer 216 that receives and buffers the graphics commands for synchronization/flow control and load balancing,
- display lists 212 from main memory 112 via an on-chip call FIFO memory buffer 218, and
- vertex attributes from the command stream and/or from vertex arrays 214 in main memory 112 via a vertex cache 220.

Command processor 200 performs command processing operations 200a that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include:
- a transform unit 300,
- a setup/rasterizer 400,
- a texture unit 500,
- a texture environment unit 600, and
- a pixel engine 700.

Transform unit 300 performs a variety of 2D and 3D transform and other operations 300a (see FIG. 5). Transform unit 300 may include one or more matrix memories 300b for storing matrices used in transformation processing 300a. Transform unit 300 transforms incoming geometry per vertex from object space to screen space; and transforms incoming texture coordinates and computes projective texture coordinates (300c). Transform unit 300 may also perform polygon clipping/culling 300d. Lighting processing 300e also performed by transform unit 300b provides per vertex lighting computations for up to eight independent lights in one example embodiment. Transform unit 300 can also perform texture coordinate generation (300c) for embossed type bump mapping effects, as well as polygon clipping/culling operations (300d).

Setup/rasterizer 400 includes a setup unit which receives vertex data from transform unit 300 and sends triangle setup information to one or more rasterizer units (400b) performing edge rasterization, texture coordinate rasterization and color rasterization.

Texture unit 500 (which may include an on-chip texture memory (TMEM) 502) performs various tasks related to texturing including for example:
- retrieving textures 504 from main memory 112,
- texture processing (500a) including, for example, multi-texture handling, post-cache texture decompression, texture filtering, embossing, shadows and lighting through the use of projective textures, and BLIT with alpha transparency and depth,
- bump map processing for computing texture coordinate displacements for bump mapping, pseudo texture and texture tiling effects (500b), and
- indirect texture processing (500c).

Texture unit 500 outputs filtered texture values to the texture environment unit 600 for texture environment processing (600a). Texture environment unit 600 blends polygon and texture color/alpha/depth, and can also perform texture fog processing (600b) to achieve inverse range based fog effects. Texture environment unit 600 can provide multiple stages to perform a variety of other interesting environment-related functions based for example on color/alpha modulation, embossing, detail texturing, texture swapping, clamping, and depth blending.

Pixel engine 700 performs depth (z) compare (700a) and pixel blending (700b). In this example, pixel engine 700 stores data into an embedded (on-chip) frame buffer memory 702. Graphics pipeline 180 may include one or more embedded DRAM memories 702 to store frame buffer and/or texture information locally. Z compares 700a'can also be performed at an earlier stage in the graphics pipeline 180 depending on the rendering mode currently in effect (e.g., z compares can be performed earlier if alpha blending is not required). The pixel engine 700 includes a copy operation 700c that periodically writes on-chip frame buffer 702 to main memory 112 for access by display/video interface unit 164. This copy operation 700c can also be used to copy embedded frame buffer 702 contents to textures in the main memory 112 for dynamic texture synthesis effects. Anti-aliasing and other filtering can be performed during the copy-out operation. The frame buffer output of graphics pipeline 180 (which is ultimately stored in main memory 112) is read each frame by display/video interface unit 164. Display controller/video interface 164 provides digital RGB pixel values for display on display 102.

Example Shadow Mapping Technique

In the example embodiment, transform unit 300 includes lighting calculation hardware that may be programmed to calculate a lighting equation including a distance attenuation factor. See, for example, commonly-assigned U.S. provisional Application No. 60/227,007, filed Aug. 23, 2000 and its corresponding utility application Ser. No. 09/726,216, filed Nov. 28, 2000 (atty. dkt. no. 723-967), both entitled "Achromatic Lighting Functions In A Graphics System And Method" (Attorney Docket No. 723-748). Such lighting calculation can be used to determine the distance from a light to an arbitrary surface in the scene being rendered. Because the light intensity is attenuated (e.g., linearly) with distance, the resulting brightness value at a rendered surface can be used as an indication of the distance from the light to the surface. This computed depth value can be compared with a shadow map depth value to determine whether or not to shadow a pixel.

In the example embodiment, the lighting calculation output is eight bits wide. For example, this value might be contained in a single color component (e.g., the red component of an RGB triplet). While 8-bit precision is perfectly acceptable for lighting operations, it may be insufficient for performing the comparison with shadow map depth to provide a full scene shadowing technique for scenes having arbitrary shadow complexity. While it would be possible to modify transform unit 300 to provide more than eight bits per channel, this would increase the cost and complexity of the transform unit.

Texture unit 500 following the transform unit 300 in graphics pipeline 180 has substantial precision per color channel, and this precision is propagated through graphics pipeline 180. Texture unit 500 is not a general purpose processor, but rather, in the preferred embodiment is designed to perform texture mapping functions. We discovered a way to use the texture coordinate generating hardware to develop a distance and then, once that distance is in the texture coordinate(s), to sample a texture and get more than eight bits of precision. For example, in one implementation we can obtain sixteen bits up to even nineteen bits of accuracy in this particular embodiment for shadow comparisons.

In more detail, we have discovered an alternative technique that allows us to use the higher precision texture coordinate generator and texture mapping unit 500 of system 50 to increase the precision of depth values calculated by graphics pipeline 180 for comparison with a shadow map. FIG. 6 shows an example routine 1000 that system 50 can provide full-scene shadow mapping with higher numerical precision depth comparisons. In this example, graphics pipeline 180 generates a shadow map depth texture in a first pass (block 1002). In a second pass, the shadow map depth texture is projected into the scene using conventional texture projection techniques (block 1002). Also in the second pass, transform unit 300 uses texture coordinate generation and texture mapping to determine a precision numerical value representing the distance from a light position to surfaces being rendered (block 1004).

In more detail, we control the transform unit 300 to generate texture coordinates representing the distance from the surface to the light (e.g., using a combination of a modelview transformation of vertex position from the light position, and an additional scaling transformation that takes the dynamic range of scene depth into account). We then apply the resulting texture coordinates to texture unit 500 for the purpose of looking up higher precision depth values stored in a ramp function table that a texture unit can process as an ordinary texture (block 1006). The high precision distance values so obtained can be compared to corresponding shadow map depth values to determine whether or not to shadow pixels (block 1008). System 50 can then display full-scene shadowed images produced by this technique (block 1010; see FIG. 15 for an example image).

More Detailed Example Implementation

FIG. 7 shows an example more detailed procedure 1020 for operating system 50 to provide the full-scene shadowed images, and FIG. 8 shows an example second pass graphics pipeline processing to provide full-scene shadowed images. FIG. 7 shows a shadow map generated in the first pass by rendering the scene depth from the light source viewpoint into the z buffer portion of embedded frame buffer 702 (block 1022). See commonly-assigned copending application provisional Application No. 60/226,900, filed Aug. 23, 2000 and its corresponding utility application Ser. No. 09/726,226, filed Nov. 28, 2000 (atty. dkt. no. 723-964), both entitled "Method And Apparatus For Anti-Aliasing In A Graphics System." The example embodiment activates front-face culling during this operation to implement the Wang et al., "second depth" algorithm discussed above. The resulting depth map stored in the embedded frame buffer 702 is copied out into a texture by pixel engine 700 (block 1024). See commonly-assigned provisional Application No. 60/227,030, filed Aug. 23, 2000 and its corresponding utility application Ser. No. 09/722,663, filed Nov. 28, 2000 (atty. dkt. no. 723-963), both entitled "Graphics System With Copy Out Conversions Between Embedded Frame Buffer And Main Memory." To increase efficiency, block 1022 can be performed with color frame buffer updates off since we are only concerned about generating depth values.

During a second pass, the scene is rendered from the viewpoint of the camera (i.e., the user) (block 1026). For each pixel, an appropriate texture projection matrix is applied to project the shadow map texture into the scene (block 1026). Additionally, the position of the vertex in object space is transformed using a modelview matrix defining a viewpoint at the light source—converting from object space to light space (the same space the shadow map was rendered in) (block 1028). The resulting z value represents the distance from the surface to the light.

In the example embodiment, the texture coordinate generation process performs an additional transformation on this depth value. This additional transformation is based on the dynamic depth range of the scene. The texture coordinate generation process is used, in the example embodiment, to transform the calculated distance value based on the dynamic distance range (i.e., the difference between the closest surface the camera can "see" and the furthest-away surface the camera can see). See FIG. 11.

The result of the second transformation provides a texture coordinate(s) for indexing into a lookup table ramp "texture" that defines a (e.g., linearly) increasing depth ramp (block 1030). In the example embodiment, the texture unit 500 treats the ramp lookup table as any other texture and performs a normal texture mapping operation on it based on the texture coordinate(s) generated by transform unit 300. See, for example, commonly-assigned U.S. provisional Application No. 60/226,891, filed Aug. 23, 2000 and its corresponding utility application Ser. No. 09/722,382, filed Nov. 28, 2000, (atty. dkt. no. 723-961), both entitled "Method And Apparatus For Direct and Indirect Texture Processing In A Graphics System." However, resulting texel values are not used to immediately modify surface color or opacity. Rather, they provide precision depth values that are compared with corresponding projected shadow map depth values to make shadowing decisions (block 1032).

The ramp function might ideally be stored in a one-dimensional texture having sufficient resolution. However, many low cost graphics systems have a limitation on the maximum size of textures they can handle. For example, in one implementation, system 50 can handle textures with a maximum size of 1024×1024 texels. A one-dimensional 1024-texel ramp function texture provides 10 bits of numerical precision. This is better than 8 bits, but we want to do better. Therefore, we use texture coordinate generation to encode the depth value (distance from light to surface) in the combined values of two texture coordinates (s, t)—and we store the ramp function into a two-dimensional texture of a size that provides sufficient precision to suit our needs. For example, a 1024×1024 two-dimensional texture can provide (nearly) double the precision as compared to a 1024-texel one-dimensional texture. To maximize precision, we can also dynamically transform the depth value based on the depth range of the scene so that none of the 2D ramp texture values are wasted on distances that will never be accessed.

Referring again to FIG. 7, once we have used the texture coordinate generation and texture mapping process to obtain a surface depth value, we can compare this depth value with a corresponding depth value in the shadow map. If the shadow map depth is less than the pixel depth relative to the light, the pixel is in shadow and its brightness is attenuated ("yes" exit to decision block 1032, block 1034). Operations 1026–1034 are performed for each pixel being rendered. When all pixels on all surfaces have been processed ("no" exit to decision block 1036), the full-scene shadowed image is complete and may be displayed (block 1038).

FIG. 8 shows operations performed by graphics pipeline 180 during the second pass. In this example, transform unit 300 performs a conventional modelview transform based on a camera at the viewer's viewpoint, and also lights incoming vertex definitions (block 1050) to provide the results to rasterizer 400 (block 1052) for production of rasterized Gouraud-shaded pixel color/alpha/z. In the example embodiment, these values are provided to texture environment unit 600 for blending (block 1054). In this example, a predetermined shadow color value is also provided to the blend operation (1054).

A conventional projective texture transformation (orthographic or perspective, depending on the preference of the artist who designed the scene) is performed by transform unit 300 (block 1056) to generate texture coordinates (block 1058). The texture unit 500 performs the corresponding texture mapping operation to project the shadow map texture onto the scene. The resulting depth values are supplied to a compare operation (1060)—which in the example embodiment is performed by texture environment unit 600.

The pixel depth value is provided by blocks 1062, 1064, 1066 via transform unit 300 and texture unit 500. As explained above, a modelview transformation performed by transform unit 300 determines pixel depth from the light (block 1062) by transforming the location of the pixel to the location of the light that is casting the shadow. A further transform associated with texture coordinate generation can be used to transform the resulting z (depth) value based on the depth range of the scene (block 1064). These two transformations (1062, 1064) can be combined and performed by a single matrix multiplication that generates texture coordinates s, t. The resulting texture coordinates s, t are used by texture unit 500 to perform a texture mapping operation that looks up a precision distance value from a ramp texture lookup table (block 1066). This resulting value is used by compare block 1060 to compare with the shadow map depth.

Compare operation 1060 compares the shadow map depth value with a pixel depth value relative to the position of the light casting the shadow. The output of the comparison is provided to blend operation (1054) to control whether or not the predetermined shadow color is to be used instead of the rasterized shaded pixel color. In another embodiment, the blend operation 1054 could modulate (e.g., attenuate) the pixel color to darken pixels that the depth comparison reveals are in shadow.

Example Ramp Textures

As explained above, using one example implementation of system 50, encoding the pixel distance value in a single texture coordinate to look up a one-dimensional texture providing an identity (i.e., pass-through) would provide ten bits of distance precision based on a maximum texture size of 1024 by 1024 texels. Using two texture coordinates (e.g., with one coordinate being a scaled version of the other) provides a way to propagate a ramp distance function through all (or most) of the texels in a two-dimensional texture. FIGS. 9A and 9A show illustrative example two-dimensional ramp textures for 8-bit (16×16) and 16-bit (256×256) texture formats respectively. Notice that in each case, a linearly increasing ramp function appears down each column of the texture. The ramp function is continued in successive columns to provide a continuous ramp function from a minimum value (e.g., 00 or 0000) to a maximum value (e.g., 0xFF or 0xFFFF). Such ramp textures can be dynamically generated by main processor 110 using a procedure (see FIG. 10), or they may be defined statically beforehand and simply loaded from mass storage when needed. In these examples, a particular texture column is selected by the S coordinate, and the T texture coordinate selects a particular distance-valued texel within the selected column.

The illustrative ramp textures allow two texture coordinates S, T to encode a precision distance value that can be generated through a texture mapping operation —providing essentially double the precision that would be available by using a single texture coordinate. For example, using the texture mapping operation based on the example textures shown in FIGS. 9A & 9B produces the following correspondence between input texture coordinate values and output texel (depth) values:

| S, T  | Texel Value |
|-------|-------------|
| 0, 0  | 00          |
| 0, 1  | 01          |
| 0, 2  | 02          |
| 0, 3  | 03          |
| so on | so on       |

In the example embodiment, each texel is interpreted as a numerical value. For example, 16-bit wide texels can be interpreted as 16-bit numbers. When texture mapping, the nearest sample value should be selected (e.g., bilinear interpolation should not be used).

FIG. 11 shows an example technique that uses the texture coordinate generating hardware within transform unit 300 to generate texture coordinates s, t representing distance for lookup into a ramp texture such as that shown in FIGS. 9A and 9B. In the example embodiment, a camera is configured to provide a certain angle of view, a certain position and a certain distance range. The camera distance range is parameterized by a nearz value (N) and a farz value (F)—with the depth range of the camera being specified by the distance between farz and nearz (i.e., F–N). These range parameters are used to transform a vertex position to provide an overall transformation of the vertex position from object space to light space that spreads out the dynamic range of the numerical precision the ramp provides so that it exactly "fits" the scene's depth range.

The particular function used in the example embodiment for transforming the distance into a pair of texture coordinates is different depending upon whether the projection is perspective or orthographic. The following shows example computations for these two cases:

<Perspective>

$$s = \frac{F}{F-N} + \frac{1}{z}\frac{NF}{F-N}, \quad t = s \times scale$$

example scale=16 (8bit mode)/256 (16bit mode)

$$M = \begin{pmatrix} 0 & 0 & \frac{F}{F-N} & \frac{NF}{F-N} \\ 0 & 0 & Sc \cdot \frac{F}{F-N} & Sc \cdot \frac{NF}{F-N} \\ 0 & 0 & 1 & 0 \end{pmatrix}$$

The s becomes 0 when z=−N and 1 when z=−F.

<Orthographic>

$$s = -\frac{z}{F-N} - \frac{N}{F-N}, \quad t = s \times scale$$

example scale=16 (8 bit mode)/ 256 (16 bit mode)

$$M = \begin{pmatrix} 0 & 0 & \frac{-1}{F-N} & \frac{-N}{F-N} \\ 0 & 0 & Sc \cdot \frac{-1}{F-N} & Sc \cdot \frac{-N}{F-N} \\ 0 & 0 & 0 & 1 \end{pmatrix}$$

The s becomes 0 when z=−N and 1 when z=−F.

Note that the z value is present in both of these computations. The resulting transformation matrices shown above convert the z value derived from a modelview transformation based on position of the light into s, t texture coordinates used to index into the ramp textures such as those shown in FIG. 9A, 9B. Because the transform unit 300 provides relatively high-precision texture generation computations (especially when two texture coordinates are being generated in parallel) and the example ramp textures provide relatively high-precision lookup values (especially in the case where two texture coordinates are used to map a two-dimensional texture), relatively high-precision pixel depth values can be provided using this technique.

Figures 12A, 12B:
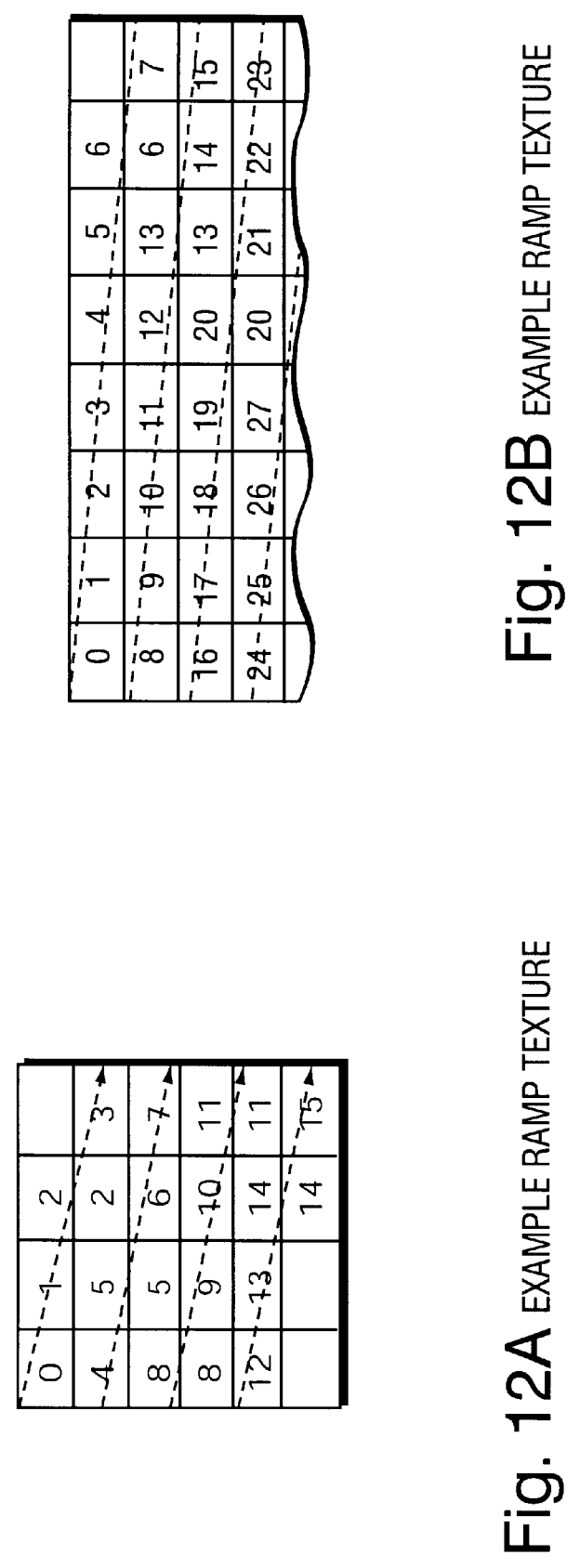

Although the precision provided is now adequate, ambiguities in the 2-D texture mapping process can occur which will occasionally cause an incorrect value to be selected from the ramp texture. In the ramp texture examples shown in FIGS. 9A and 9B, it is possible to cross a boundary and "jump" to an incorrect value, which may introduce artifacts into the shadow comparison. For example, errors can be introduced by providing the ramp function across the entire width of the texture such that every time the system traverses a texture it moves on to the next adjacent row or column of the texture. To eliminate these errors, it is possible to use a modified ramp texture containing a smaller number of unique depth values and stores redundant values to eliminate lookup errors. FIGS. 12A and 12B are examples of such ramp textures.

The ramp textures shown in FIGS. 12A and 12B provide a shallow ramp function which spans straight across the texture map in a one-dimensional format but which, every once in a while (i.e., where the ramp "crosses" between texture rows), provides an identical sample on the next line down. As shown in FIGS. 12A and 12B, a modified approach is to move down to the next line in the texture whenever the system traverses a full line minus one texel in the line. For example, referring to the simplified ramp texture of FIG. 12A, because the period of the ramp is not exactly the width of the texture, it is possible to replicate a certain number of texels on each adjacent one-dimensional texture line. Thus, in the example ramp texture shown in FIGS. 12A and 12B, not all of the texels represent unique values because some of them are replicated. Furthermore, some of the texels may contain null values because the ramp function will access them. In these examples, not every texel is used but very nearly every texel can be used. The equation used to calculate depth values shown above is used to come up with a shallow line that has exactly the right slope to traverse the texture. The texture generating hardware within transform unit 300 in the example embodiment and the texture sampling in generation/rasterizing of the texture coordinates are accurate enough to maintain this slope and not introduce any artifacts through the texture. The example ramp textures shown in FIGS. 12A, 12B therefore introduce no errors under these conditions, and the shadow comparison is free from artifacts resulting from ramp texture lookup errors.

Example Detailed Implementation

FIGS. 13A and 13B show an example more complete detailed implementation of an application executing in main processor 110 to perform shadow mapping on system 50. Procedure 1100 begins by initializing system 50 (block 1102), including vertex formats and scene parameters including lights (block 1104). Routine 1100 then creates or retrieves one or more ramp textures as described above (block 1106), and prepares for a first pass operation by turning off the display mode and reserving memory for a dynamic shadow map (block 1108). System 50 then disables the color frame buffer update (only z will be updated) (block 1110), and sets up the shader within texture environment unit 600 for a first pass operation to generate the shadow depth map (block 1112). System 50 enables front face culling to draw only "second" surfaces from the light (block 1114) and sets the viewport to the light position (block 1116). Graphics pipeline 180 then draws the scene, performing hidden surface removal to create a depth map within the z buffer (block 1118). Once the scene is drawn from the position of the light, the z buffer depth map (which now contains the depths of all closest "second" surfaces of all primitives within the scene relative to the light position), system 50 copies the z buffer into a texture and flushes the z buffer (block 1120).

Preparing for a second pass operation, system 50 enables color updates (block 1122) and turns off front-face culling (block 1124). System 50 then sets the viewport/camera/light for rendering the main image (block 1126), and sets up the shadow map texture (block 1128). System 50 sets the mode/stages for the recirculating shader within texture environment unit 600 for second pass parameters to draw the actual scene from the viewer with full-scene shadows (block 1130). As shown in FIG. 14, an example shader configuration will cause:

a stage zero shader operation to load the depth value from the ramp texture;

a stage one shader operation to compare the loaded ramp texture depth value with the shadow map depth value and output a 0 if the ramp texture depth value is greater than or equal to the shadow map depth value; and in a stage two shader operation, outputting a preset shadow color if stage one produced zero and otherwise outputting the rasterized color.

For more information concerning the operation of the recirculating shader contained within texture environment unit 600, see commonly assigned provisional Application No. 60/226,888, filed Aug. 23, 2000 and its corresponding utility application Ser. No. 09/722,367, filed Nov. 23, 2000 (atty. dkt. no. 723-968), both entitled "Recirculating Shade Tree Blender For A Graphics System."

Processor 110 then loads texture coordinate generation matrices for the shadow map texture projection and the ramp depth value texture lookup (block 1132). In one particular implementation, the following source code can be used to generate the shadow projection matrix and the depth lookup matrix (perspective or orthographic):

```
{
    // Shadow projection matrix, Perspective projection
    MTXLightFrustum(
        proj,
        - (cam->cfg.top), // t = -y in projected texture
        cam->cfg.top,
        cam->cfg.left,
        - (cam->cfg.left),
        cam->cfg.znear,
        0.50F,
        0.50F,
        0.50F,
        0.50F );
    // Depth lookup matrix, Perspective Projection
    // in order to generate:
    //    s = (1 + N/z) * F / (F - N)
    //    t = s * tscale due to the texture size
    MTXRowCol(dp, 0, 2) = f / range;
    MTXRowCol(dp, 0, 3) = f * n / range;
    MTXRowCol(dp, 1, 2) = MTXRowCol (dp, 0, 2) * tscale;
    MTXRowCol(dp, 1, 3) = MTXRowCol (dp, 0, 3) * tscale;
    MTXRowCol(dp, 2, 2) = 1.0F;
}
{
    // Shadow projection matrix, Orthographic Projection
    MTXLightOrtho (
        proj,
        - (cam->cfg.top), // t = -y in projected texture
        cam->cfg.top,
        cam->cfg.left,
        - (cam->cfg.left),
        0.50F,
        0.50F,
        0.50F,
        0.50F );
    // Depth lookup matrix, Orthographic projection
    // in order to generate:
    //    s = - (z + N) / (F - N)
    //    t = s * tscale due to the texture size
    MTXRowCol(dp, 0, 2) = - 1.0F / range;
    MTXRowCol(dp, 0, 3) = - n / range;
    MTXRowCol(dp, 1, 2) = MTXRowCol(dp, 0, 2) * tscale;
    MTXRowCol(dp, 1, 3) = MTXRowCol(dp, 0, 3) * tscale;
    MTXRowCol(dp, 2, 3) = 1.0F;
}
MTXConcat(proj, cam->view, tmo->texProj);
MTXConcat(dp,   cam->view, tmo->depth);
```

The following source code example fragment sets up parameters for a light including an appropriate transformation matrix that is multiplied by the modelview matrix:

```
/*-----------------------------------------------------------------
*
    Name:           SetLight
    Description:    Set up light parameters
    Arguments:      light : pointer to a MyLightObj structure
                    v     : view matrix
    Returns:        none
/*-----------------------------------------------------------------
/
void SetLight( MyLightObj* light, Mtx v )
{
    Vec 1pos = light->cam.cfg.location;
    // Multipled by view matrix
    MTXMultVec(v, &1pos, &1pos);
    GxInitLightPos(&light->1obj, 1pos.x, 1pos.y, 1pos.z);
    GxInitLightColor(&light->1obj, COL_LIGHT);
    GXLoadLightObjImm(&light->1obj, GX_LIGHT0);
}
```

Once the various transformation matrices are loaded, processor 110 then loads the shadow map and ramp textures into texture unit 500 (block 1134). Graphics pipeline 180 may now draw the scene (block 1136) which may be displayed (block 1138) upon completion.

As discussed above, the recirculating shader within texture environment unit 600 is used in the example embodiment to both perform the shadow depth comparison and blend in a shadow color based on the comparison results. Different recirculating shader stages may be used depending upon the particular precision of the shadow mapping operation being performed.

In one example implementation, an 8/16/24-bit comparator is available within the recirculating shader to compare the two depth values in a single stage. In embodiments where such a comparator is not available (e.g., only lower precision, 8-bit comparisons can be performed), the recirculating shader can still perform a higher precision comparison but may require multiple stages to do so. For example, one stage might be used to compare a most significant portion of each depth value (e.g., contained in one texel color component), and (an)other stage(s) might be used to compare a least significant position(s) of each value (e.g., contained in another texel color component). The following show some example recirculating shader configurations for different precision shader operations that require only an 8-bit comparator. In these examples, R0 holds shadow color, RASC is lit vertex color, and RP=TEVPREV register.

<Example 8bit comparison mode>

Stage0: $RP_{RGB}$=Ramp tex(I8)

Stage1: $RP_{RGB}$=$RP_{RGB}$>=Shadow ma$_{PRRR}$?0:255

Stage2: $RP_{RGB}$=$RP_{RGB}$==0 ? $RO_{RGB}$:RASC

<Example 16bit comparison mode using a sequence of 8-bit compares>

R2=constant {1, 1, 1, 1}

Stage0: $R1_{RGB/A}$=Ramp tex(IA8)

Stage1: $RP_{RGB}$=$R1_{RGB}$>=Shadow ma$_{PGGG}$? 0:255

Stage2: $R1_{RGB}$=$R1_A$–Shadow ma$_{PRRR}$

Stage3: $RP_{RGB}$=$R1_{RGB}$–$RP_{RGB}$×$R2_{RGB}$>=0 ?0:255

Stage4: $RP_{RGB}$=$RP_{RGB}$==0 ?$RO_{RGB}$:RASC

<Example 4 stage 16bit mode (may introduce some artifacts)>

R2=constant {1, 1, 1, 1}

Stage0: $R1_{RGB/A}$=(255–$R2_{RGB/A}$)×Ramp tex(IA8)

Stage1: $RP_{RGB}$=$R1_{RGB}$–(255–$R2_{RGB}$)×Shadow map$_{GGG}$>=0 ?0:255

Stage2: $RP_{RGB}$=$R1_{RGB}$–(255–$R2_{RGB}$)×Shadow ma$_{PRRR}$–$R2_{RGB}$×$RP_{RGB}$>=0 ? 0:255

Stage3: $RP_{RGB}$=$RP_{RGB}$==0?$RO_{RGB}$:RASC

The following example source code provides additional details of how to control an example recirculating shader to perform desired comparisons and shadow drawing:

```
//  ----------------------------------------
    // 8bit comparison version
    //  ----------------------------------------
    GXSetNumTevStages (3);
    // TEV Stage 0 ( Loads a depth value from ramp texture )
    GXSetTevOrder(GX_TEVSTAGE0, GX_TEXCOORD1,
                  GX_TEXMAP1, GX_COLOR_NULL);
    GXSetTevColorIn(GX_TEVSTAGE0, GX_CC_ZERO, GX_CC_ZERO,
                    GX_CC_ZERO, GX_CC_TEXC);
    GXSetTevColorOp(GX_TEVSTAGE0, GX_TEV_ADD, GX_TB_ZERO,
                    GX_CS_SCALE 1, GX_TRUE, GX_TEVPREV);
    GXSetTevClampMode(GX_TEVSTAGE0, GX_TC_LINEAR);
    // TEV Stage 1 ( REGPREV >= shadow map texture ? 0 : 255 )
    GXSetTevOrder(GX_TEVSTAGE1, GX_TEXCOORD0,
                  GX_TEXMAP0, GX_COLOR_NULL);
    GXSetTevColorIn(GX_TEVSTAGE1, GX_CC_ZERO, GX_CC_TEXRRR,
                    GX_CC_ONE, GX_CC_CPREV);
    GXSetTevColorOp(GX_TEVSTAGE1, GX_TEV_SUB, GX_TB_ZERO,
                    GX_CS_DIVIDE_2, GX_FALSE, GX_TEVPREV);
    GXSetTevClampMode(GX_TEVSTAGE1, GX_TC_LE);
    // TEV Stage 2 ( REGPREV == 0 ? shadow color : rasterized color )
    // Register 0 is supporsed to hold shadow color
    GXSetTevOrder(GX_TEVSTAGE2, GX_TEXCOORD_NULL,
                  GX_TEXMAP_NULL, GX_COLOR0A0);
    GXSetTevColorIn(GX_TEVSTAGE2, GX_CC_C0, GX_CC_RASC,
                    GX_CC_CPREV, GX_CC_ZERO);
    GXSetTevColorOp(GX_TEVSTAGE2, GX_TEV_ADD, GX_TB_ZERO,
                    GX_CS_SCALE_1, GX_TRUE, GX_TEVPREV);
    GXSetTevClampMode(GX_TEVSTAGE2, GX_TC_LINEAR);
}
else
{
    //  ----------------------------------------
    // 16bit comparison version
    //  ----------------------------------------
    GxSetNumTevStages(5);
    // REG2 = constant {1, 1, 1, 1}
    GXSetTevColor(GX_TEVREG2, col_one);
    // TEV Stage 0 ( Loads a depth value from ramp texture )
    // TEXA -> REG1(A) / TEXC -> REG1(C)
    GxSetTevOrder(GX_TEVSTAGE0, GX_TEXCOORD1,
                  GX_TEXMAP1, GX_COLOR_NULL);
    GxSetTevColorIn(GX_TEVSTAGE0, GX_CC_ZERO, GX_CC_ZERO,
                    GX_CC_ZERO, GX_CC_TEXC);
    GXSetTevColorOp(GX_TEVSTAGE0, GX_TEV_ADD, GX_TB_ZERO,
                    GX_CS_SCALE_1, GX_TRUE, GX_TEVREG1);
    GXSetTevAlphaIn(GX_TEVSTAGE0, GX_CA_ZERO, GX_CA_ZERO,
                    GX_CA_ZERO, GX_CA_TEXA);
    GXSetTevAlphaOp(GX_TEVSTAGE0, GX_TEV_ADD, GX_TB_ZERO,
                    GX_CS_SCALE_1, GX_TRUE, GX_TEVREG1);
    GXSetTevClampMode(GX_TEVSTAGE0, GX_TC_LINEAR);
    // TEV Stage 1 ( Compare Lower 8bit )
    // REGPREV(C) = REG1(C) >= shadow map(G) ? 0 : 255
    GXSetTevOrder(GX_TEVSTAGE1, GX_TEXCOORD0,
                  GX_TEXMAP0, GX_COLOR_NULL);
    GXSetTevColorIn(GX_TEVSTAGE1, GX_CC_ZERO, GX_CC_TEXGGG,
                    GX_CC_ONE, GX_CC_C1);
    GXSetTevColorOp(GX_TEVSTAGE1, GX_TEV_SUB, GX_TB_ZERO,
                    GX_CS_DIVIDE_2, GX_TRUE, GX_TEVPREV);
    GXSetTevAlphaIn(GX_TEVSTAGE1, GX_CA_ZERO, GX_CA_ZERO,
                    GX_CA_ZERO, GX_CA_ZERO); // Dummy
    GXSetTevAlphaOp(GX_TEVSTAGE1, GX_TEV_ADD, GX_TB_ZERO,
                    GX_CS_SCALE_1, GX_TRUE, GX_TEVPREV); // Dummy out
    GXSetTevClampMode(GX_TEVSTAGE1, GX_TC_GE);
    // TEV Stage 2 ( Compare Higher 8 bit )
    // REG1(C) = ( REG1(A) - shadow map(R) ) without clamp
    GXSetTevOrder(GX_TEVSTAGE2, GX_TEXCOORD0,
                  GX_TEXMAP0, GX_COLOR_NULL);
    GXSetTevColorIn(GX_TEVSTAGE2, GX_CC_ZERO, GX_CC_TEXRRR,
                    GX_CC_ONE, GX_CC_A1);
    GXSetTevColorOp(GX_TEVSTAGE2, GX_TEV_SUB, GX_TB_ZERO,
                    GX_CS_SCALE_1, GX_FALSE, GX_TEVREG1);
    GXSetTevClampMode(GX_TEVSTAGE2, GX_TC_LINEAR);
    // TEV Stage 3 ( Compare Higher 8 bit (cont.) )
    // REGPREV(C) = REG1(C) - REGPREV(C) * 1/255 >= 0 ? 0 : 255
    GXSetTevOrder (GX_TEVSTAGE3, GX_TEXCOORD_NULL,
                   GX_TEXMAP_NULL, GX_COLOR_NULL);
    GXSetTevColorIn(GX_TEVSTAGE3, GX_CC_ZERO, GX_CC_C2,
                    GX_CC_CPREV, GX_CC_C1);
```

-continued

```
    GXSetTevColorOp(GX_TEVSTAGE3, GX_TEV_SUB, GX_TB_ZERO,
                GX_CS_DIVIDE_2, GX_TRUE, GX_TEVPREV);
    GXSetTevClampMode(GX_TEVSTAGE3, GX_TC_GE);
    // TEV Stage 4 ( Select shadow/lit color )
    // output = REGPREV == 0 ? shadow color : rasterized color
    // Register 0 is supporsed to hold shadow color
    GXSetTevOrder(GX_TEVSTAGE4, GX_TEXCOORD_NULL,
                GX_TEXMAP_NULL, GX_COLOR0A0);
    GXSetTevColorIn(GX_TEVSTAGE4, GX_CC_C0, GX_CC_RASC,
                GX_CC_CPREV, GX_CC_ZERO);
    GXSetTevColorOp(GX_TEVSTAGE4, GX_TEV_ADD, GX_TB_ZERO
                GX_CS_SCALE_1, GX_TRUE, GX_TEVPREV);
    GXSetTevClampMode(GX_TEVSTAGE4, GX_TC_LINEAR);
    // ----------------------------------------
    // Following is the TEV setting for 16bit
    // comparison by 4 stages. But it may
    // generate some error artifacts on surfaces.
    // ----------------------------------------
    /*
    GXSetNumTevstages(4);
    // REG2 = constant {1, 1, 1, 1}
    GxSetTevColor(GX_TEVREG2, col_one);
    // TEV Stage 0 ( Loads a depth value from ramp texture )
    // TEXA * 254/255 -> REG1(A)
    // TEXC * 254/255 -> REG1(C)
    GXSetTevOrder(GX_TEVSTAGE0, GX_TEXCOORD1,
                GX_TEXMAP1, GX_COLOR_NULL);
    GXSetTevColorIn(GX_TEVSTAGE0, GX_CC_TEXC, GX_CC_ZERO,
                GX_CC_C2, GX_CC_ZERO);
    GXSetTevColorOp(GX_TEVSTAGE0, GX_TEV_ADD, GX_TB_ZERO,
                GX_CS_SCALE_1, GX_TRUE, GX_TEVREG1);
    GXSetTevAlphaIn(GX_TEVSTAGE0, GX_CA_TEXA, GX_CA_ZERO,
                GX_CA_A2, GX_CA_ZERO);
    GXSetTevAlphaOp(GX_TEVSTAGE0, GX_TEV_ADD, GX_TB_ZERO,
                GX_CS_SCALE_1, GX_TRUE, GX_TEVREG1);
    GXSetTevClampMode(GX_TEVSTAGE0, GX_TC_LINEAR);
    // TEV Stage 1 ( Compare Lower 8bit )
    // REGPREV(C) = REG1(C) >= shadow map(G) * 254/255 ? 0 : 255
    GXSetTevOrder(GX_TEVSTAGE1, GX_TEXCOORD0,
                GX_TEXMAP0, GX_COLOR_NULL);
    GXSetTevColorIn(GX_TEVSTAGE1, GX_CC_TEXGGG, GX_CC_ZERO,
                GX_CC_C2, GX_CC_C1);
    GXSetTevColorOp(GX_TEVSTAGE1, GX_TEV_SUB, GX_TB_ZERO,
                GX_CS_DIVIDE_2, GX_TRUE, GX_TEVPREV);
    GXSetTevAlphaIn(GX_TEVSTAGE1, GX_CA_ZERO, GX_CA_ZERO,
                GX_CA_ZERO, GX_CA_ZERO); // Dummy
    GXSetTevAlphaOp(GX_TEVSTAGE1, GX_TEV_ADD, GX_TB_ZERO,
                GX_CS_SCALE_1, GX_TRUE, GX_TEVPREV); // Dummy out
    GXSetTevClampMode(GX_TEVSTAGE1, GX_TC_GE);
    // TEV Stage 2 ( Compare Higher 8 bit )
    // REGPREV(C) = REG1(A) >= shadow map(R) * 254/255 + PREV(C)
    //                  ? 0 : 255
    GXSetTevOrder(GX_TEVSTAGE2, GX_TEXCOORD0,
                GX_TEXMAP0, GX_COLOR_NULL);
    GXSetTevColorIn(GX_TEVSTAGE2, GX_CC_TEXRRR, GX_CC_CPREV,
                GX_CC_C2, GX_CC_A1);
    GXSetTevColorOp(GX_TEVSTAGE2, GX_TEV_SUB, GX_TB_ZERO,
                GX_CS_SCALE_1, GX_TRUE, GX_TEVPREV);
    GXSetTevClampMode(GX_TEVSTAGE2, GX_TC_GE);
    // TEV Stage 3 ( Select shadow/lit color )
    // output = REGPREV == 0 ? shadow color : rasterized color
    // Register 0 is supposed to hold shadow color
    GXSetTevOrder(GX_TEVSTAGE3, GX_TEXCOORD_NULL,
                GX_TEXMAP_NULL, GX_COLOR0A0);
    GXSetTevColorIn(GX_TEVSTAGE3, GX_CC_C0, GX_CC_RASC,
                GX_CC_CPREV, GX_CC_ZERO);
    GXSetTevColorOp(GX_TEVSTAGE3, GX_TEV_ADD, GX_TB_ZERO,
                GX_CS_SCALE_1, GX_TRUE, GX_TEVPREV);
    GXSetTevClampMode(GX_TEVSTAGE3, GX_TC_LINEAR);
    */
}
```

The following is a list of a repertoire of example illustrative application programming interface commands used by system 50 to perform shadow mapping as discussed above:

| Function | Parameters | Description |
| --- | --- | --- |
| GXLoadTexMtxImm | matrix | appropriate projection mtx |
| | matrix destination | GX_TEXMTX1 |
| | type | GX_MTX3x4 |
| GXSetTexCoordGen | destination coord | GX_TEXCOORD1 |
| | texgen type | GX_TG_MTX3x4 |
| | texgen src | GX_TG_POS |
| | mtx src | GX_TEXMTX1 |
| GxInitTexObj | image pointer | appropriate |
| | width/height | appropriate |
| | format | GX_TF_IA4, GX_TF_RGB5A3 |
| | wrap mode(s, t) | GX_CLAMP, GX_REPEAT |
| | mipmap | always GX_FALSE |
| GXLoadTexObj | destination texture name | GX_TEXMAP0, GX_TEXMAP1 |
| GXInvalidateTexAll | (no parameter) | |
| GXSetTexCopySrc | top/left/width/height | only fixed size |
| GXSetTexCopyDst | width/height | only fixed size |
| | format | always GX_TF_IA4 |
| | mipmap filter | GX_TRUE |
| GXCopyTex | image pointer | appropriate |
| | clear operation | GX_TRUE |
| GXSetCopyClear | color | only one color |
| | Z value | always 0xFFFFFF |
| GXSetTevOp | tev stage ID | GX_TEVSTAGE0, GX_TEVSTAGE1 |
| | operation mode | GX_MODULATE for stage0, GX_DECAL for stage1 |
| GXSetPixelFmt | pixel format | GX_PF_RGBA6_Z24 |
| | Z compression format | always GX_ZC_LINEAR |
| GXSetDrawSync | token number | various (count up in every frame) |
| GXReadDrawSync | (no parameter) | |

Example Image Results

Figure 15:
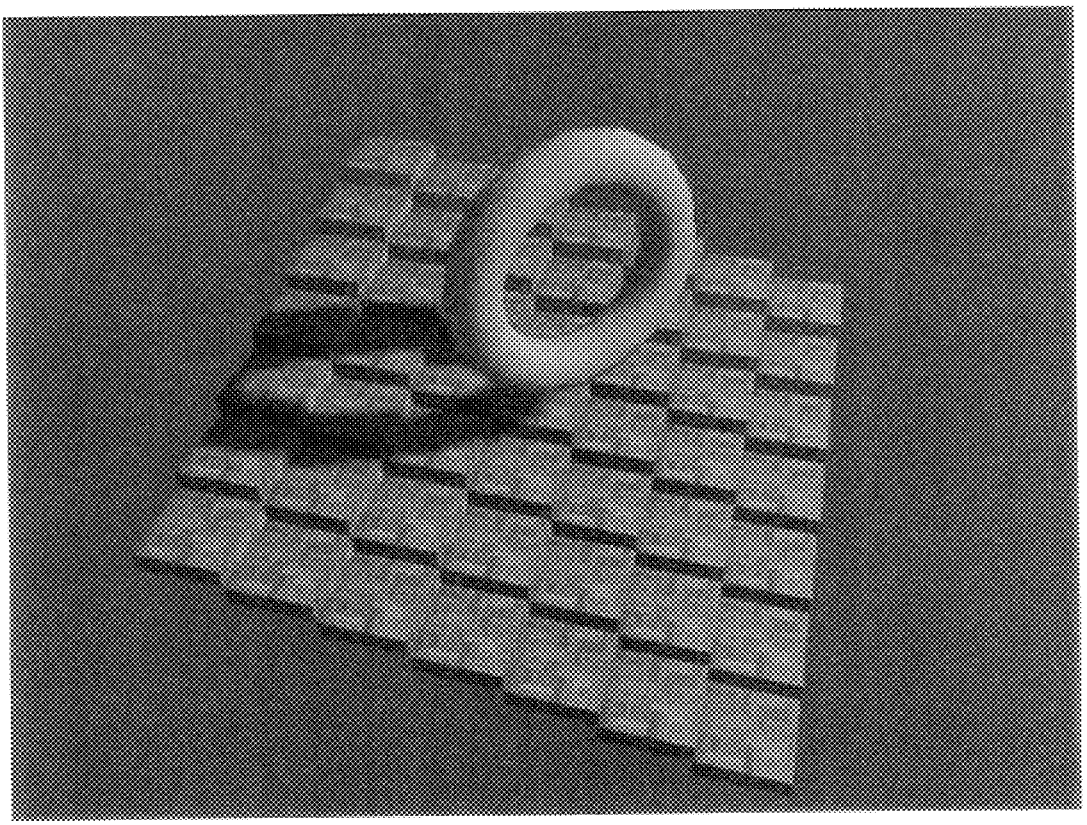
FIG. 15 shows example full scene shadow mapping image results.

FIG. 15 shows an example image produced by full-scene shadow mapping. In this example, the torus object projects a shadow onto tessellated floor panels. The light direction appears to be coming from a point away from the viewer's viewpoint. Example system 50 can render a scene such as that shown in FIG. 15 in real time.

Further Embodiment Using Identification Technique

Figure 17A:
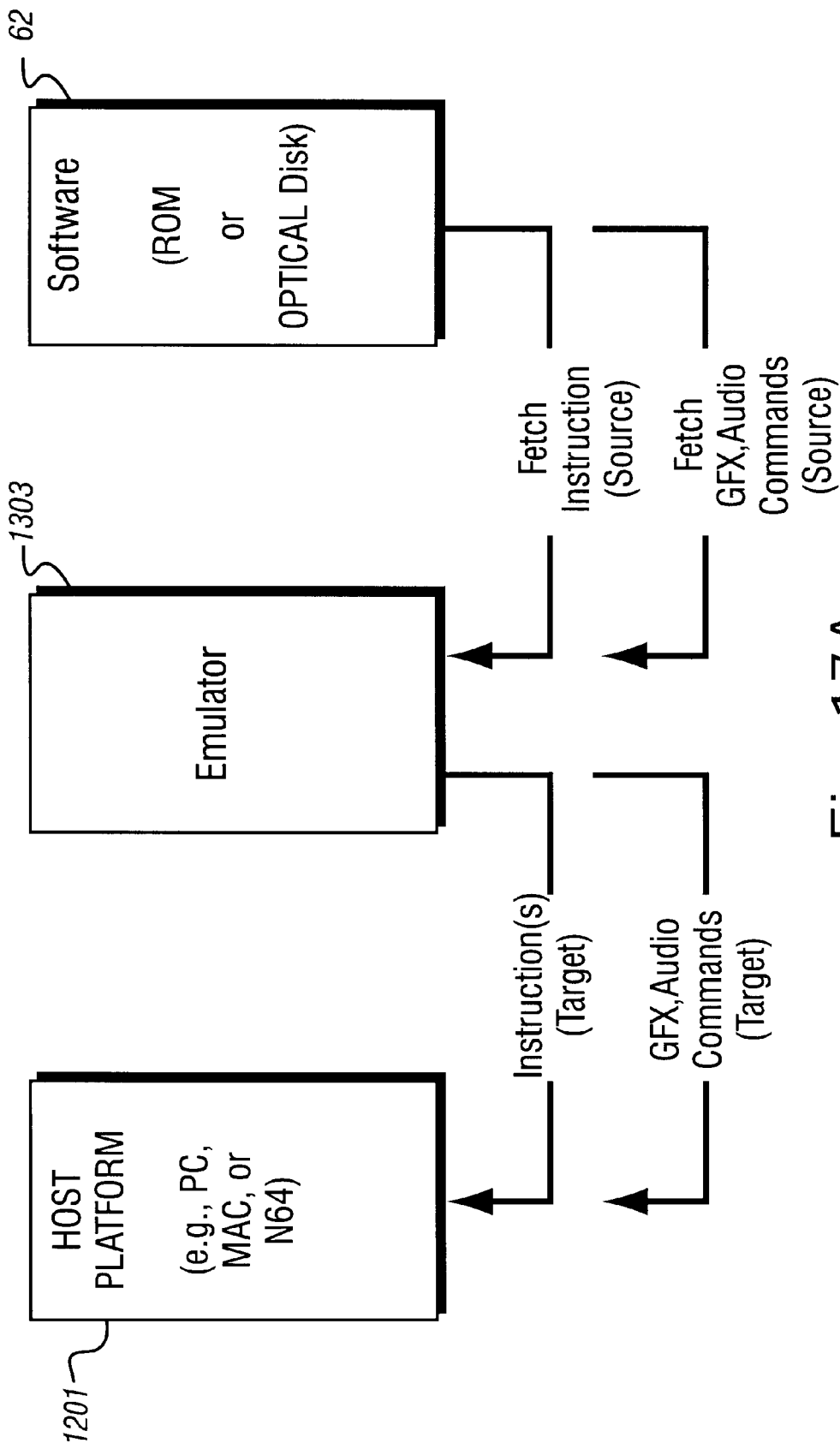
FIGS. 17A and 17B show example alternative compatible implementations.
Figure 17B:
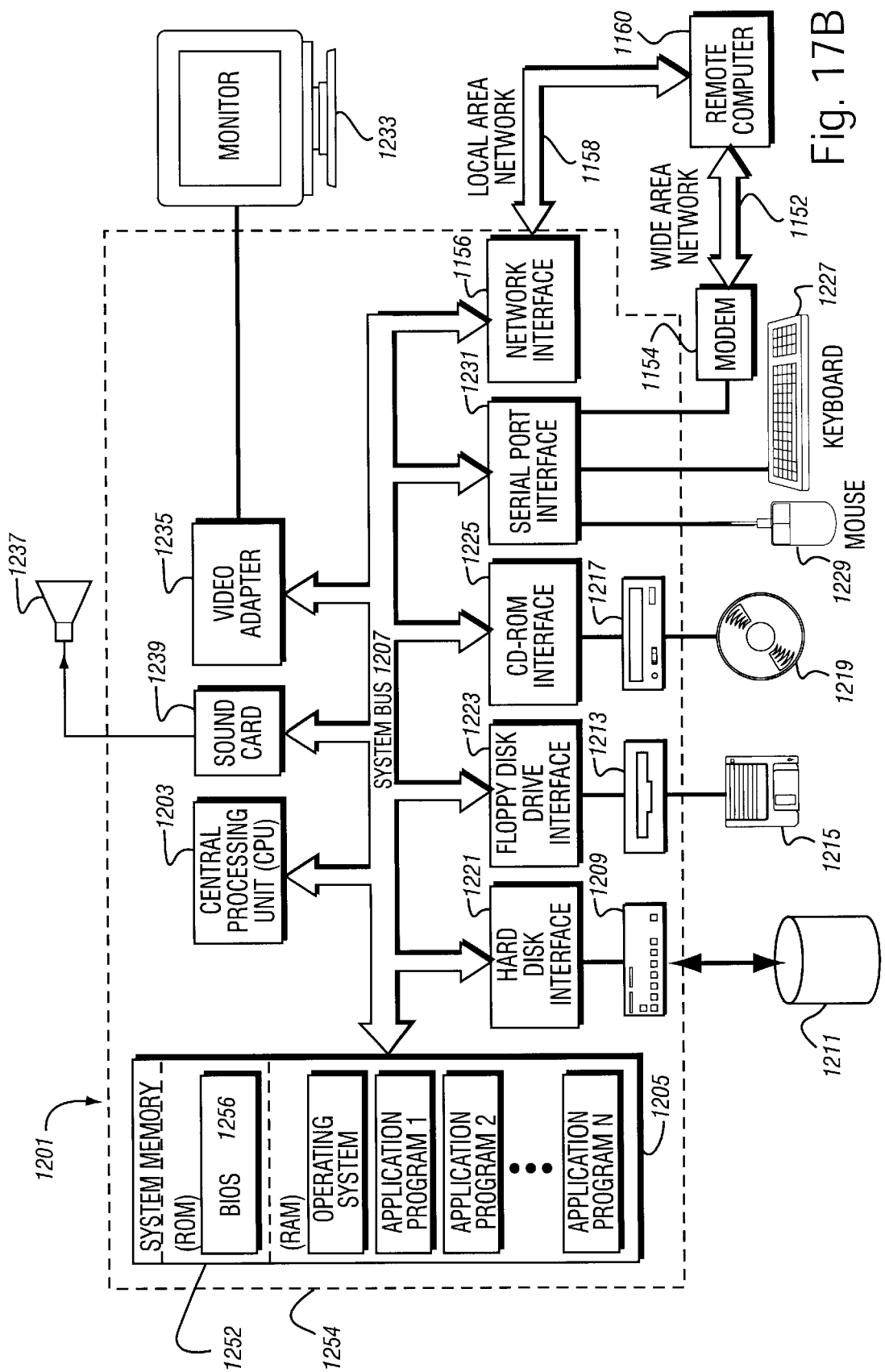

FIGS. 17A and 17B show a further shadow mapping embodiment that can be performed by system 50 based on the object identification technique. This embodiment renders the entire scene from the point of view of the light as discussed above—but instead of using a resulting z buffer as a shadow map for depth comparison, this alternative embodiment paints each object by an individual identification number. For example, this identification number may be encoded as a gray scale value in one or more of the color components of the embedded color frame buffer 702. Unique object IDs are assigned to each object In one example, the IDs are eight bits wide, and are written by main processor 110 to transform unit 300 as material colors. The object IDs are thereby carried down graphics pipeline 180 and are written into one of the color channels of embedded color frame buffer 702. The resulting color frame buffer at the end of the first pass rendering process contains the IDs of all objects the light can "see." See FIG. 16, blocks 2100–2118.

At the end of the first pass, the appropriate contents (IDs) of the color frame buffer are copied into a texture (block 2120) for use in a second-pass texture mapping process. The entire scene is then rendered again as viewed from the camera (user) viewpoint. The shadow map object ID texture is projected onto the scene using conventional texture projection, and texture environment unit 600 compares—at each pixel—the ID number of the object to the drawn and the ID number from the projected shadow map texture. If the two ID numbers are not similar, it means that a ray from the light is obstructed by another object containing another ID. Texture environment unit 600 in this instance blends a predetermined shadow color into the pixel (or otherwise attenuates the pixel brightness). The comparison is performed by texture environment unit 600 in the example embodiment in two stages: the first shader stage is used to receive the object ID from the shadow map, and the second shader stage is used to blend a predetermined shadow color based on the results of a comparison between the shadow map ID and the rendered object ID. See FIG. 16B, blocks 2126–2136.

Other Example Compatible Implementations

Certain of the above-described system components 50 could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general purpose digital computer such as a personal computer, which executes a software emulator program that simulates the hardware and/or firmware of system 50.

Some general purpose digital computers (e.g., IBM or MacIntosh personal computers and compatibles) are now equipped with 3D graphics cards that provide 3D graphics pipelines compliant with DirectX or other standard 3D graphics command application programming interfaces (APIs). They may also be equipped with stereophonic sound cards that provide high quality stereophonic sound based on a standard set of sound commands. Such multimedia-hardware-equipped personal computers running emulator software may have sufficient performance to approximate the graphics and sound performance of system 50. Emulator software controls the hardware resources on the personal computer platform to simulate the processing, 3D graphics, sound, peripheral and other capabilities of the home video game console platform for which the game programmer wrote the game software.

FIG. 16A illustrates an example overall emulation process using a host platform 1201, an emulator component 1303, and a game software executable binary image provided on a storage medium 62. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by system 50 from storage medium 62 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1303 fetches one or a sequence of binary-image program instructions from storage medium 1305 and converts these program instructions to one or more equivalent Intel binary-image program instructions. The emulator 1303 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

FIG. 16B illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 62.

All documents referred to above are hereby incorporated by reference into this specification as if expressly set forth.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

We claim:

1. A shadow mapping method comprising:
   generating texture coordinates representing a distance between a light and a surface;
   mapping a ramp texture in response to the texture coordinates to obtain a precision depth; and
   using the precision depth in a shadow mapping comparison.

2. The method of claim 1 wherein the ramp texture comprises a two-dimensional texture including redundant entries.

3. The method of claim 1 wherein the ramp texture comprises a two-dimensional texture including unused entries.

4. The method of claim 1 wherein the ramp texture includes redundant entries.

5. The method of claim 1 wherein the generating step includes:

transforming a vertex position into light space by taking into account the depth range of a scene.

6. The method of claim 1 further including rendering a shadow map into an embedded frame buffer, and copying out said shadow map into a shadow map texture for use in said shadow mapping comparison.

7. The method of claim 1 further including performing a front face culled rendering to generate a shadow map for said shadow mapping comparison.

8. The system of claim 1 wherein said ramp texture provides a linearly increasing ramp function.

9. The system of claim 1 wherein said ramp texture provides a continuous ramp function from a minimum value to a maximum value.

10. The method of claim 1 wherein said ramp texture provides a linearly increasing ramp function.

11. The method of claim 1 wherein said ramp texture provides a continuous ramp function from a minimum value to a maximum value.

12. A graphics pipeline including:

a texture coordinate generator that generates a pair of texture coordinates s, t that together encode the distance from a surface to a light;

a texture mapper that maps a ramp texture in response to said texture coordinates to provide a depth value; and a comparator that compares said depth value with a shadow map.

13. In a graphics pipeline including an embedded frame buffer, a shadow mapping technique including:

rendering a scene into the embedded frame buffer, and copying embedded frame buffer contents into a shadow map texture for use in a shadow mapping depth comparison.

14. A technique as in claim 13 wherein said rendering step comprises rendering depth values into an embedded z buffer.

15. A technique as in claim 13 wherein said rendering step comprises rendering object ID values into an embedded color frame buffer.

* * * * *